United States Patent
Di Taranto et al.

(10) Patent No.: US 11,617,121 B2
(45) Date of Patent: Mar. 28, 2023

(54) DISTRIBUTED TRAFFIC CONTROL IN FLOODING MESH NETWORKS

(71) Applicant: Telefonaktiebolaget LM Ericsson (publ), Stockholm (SE)

(72) Inventors: Rocco Di Taranto, Lund (SE); Magnus Åström, Lund (SE); Guido Roland Hiertz, Aachen (DE); Per Skillermark, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 162 days.

(21) Appl. No.: 16/960,135

(22) PCT Filed: Jan. 11, 2018

(86) PCT No.: PCT/EP2018/050621
§ 371 (c)(1),
(2) Date: Jul. 6, 2020

(87) PCT Pub. No.: WO2019/137607
PCT Pub. Date: Jul. 18, 2019

(65) Prior Publication Data
US 2021/0127316 A1    Apr. 29, 2021

(51) Int. Cl.
*H04W 40/02* (2009.01)
*H04L 45/24* (2022.01)
*H04W 40/24* (2009.01)
*H04W 84/18* (2009.01)

(52) U.S. Cl.
CPC .......... *H04W 40/023* (2013.01); *H04L 45/24* (2013.01); *H04W 40/24* (2013.01); *H04W 84/18* (2013.01)

(58) Field of Classification Search
CPC combination set(s) only.
See application file for complete search history.

(56) References Cited

U.S. PATENT DOCUMENTS

| | | | |
|---|---|---|---|
| 2006/0168318 A1* | 7/2006 | Twiss | H04L 69/329 709/238 |
| 2016/0065446 A1* | 3/2016 | Li | H04L 45/121 370/352 |
| 2017/0104727 A1* | 4/2017 | Jerkeby | H04L 63/1466 |
| 2017/0325127 A1 | 11/2017 | Raghu et al. | |
| 2018/0091416 A1* | 3/2018 | Ghosh | H04L 45/123 |

OTHER PUBLICATIONS

International Search Report and the Written Opinion of the International Searching Authority, issued in corresponding International Application No. PCT/EP2018/050621, dated Oct. 2, 2018, 14 pages.
Allard et al. "Ad hoc routing protocols with multipoint relaying" 5es rencontres francophones sur les Aspects Algorithmiques des Telecommunications (ALGOTEL), May 1, 2003, pp. 1-9.

* cited by examiner

*Primary Examiner* — Xavier S Wong
(74) *Attorney, Agent, or Firm* — Rothwell, Figg, Ernst & Manbeck, P.C.

(57) ABSTRACT

A method and apparatus for relaying messages in a mesh network.

25 Claims, 16 Drawing Sheets

| Path | Distance to Source Device for Devices in Paths | | | | | | | | |
|---|---|---|---|---|---|---|---|---|---|
| | D1 | D2 | D6 | D7 | D8 | D3 | D4 | D5 |
| P1 | 0 | 1 | | | | 2 | 3 | 4 |
| P2 | 0 | 1 | 2 | | | 3 | 4 | 5 |
| P3 | 0 | | 2 | 3 | 4 | | 5 | 6 |

DISTRIBUTED TRAFFIC CONTROL IN FLOODING MESH NETWORKS

CROSS REFERENCE TO RELATED APPLICATION(S)

This application is a 35 U.S.C. § 371 National Phase Entry Application from PCT/EP2018/050621, filed Jan. 11, 2018, designating the United States, the disclosure of which is incorporated herein by reference in its entirety.

TECHNICAL FIELD

Embodiments presented herein relate to a device, a method therein, a controller, a computer program, and a computer program product. Specifically it relates to a device making decisions on when to relay messages when participating in a mesh network using a flooding technique.

BACKGROUND

Mesh networking is a key architecture for Internet of Things (IoT). In this network topology all nodes/devices can communicate with each other; either through direct message exchange or via intermediate nodes that help forward the message from source to destination. This is often more cost effective and easier to implement than having to use additional gateway devices or access points which often need additional equipment and more extensive planning.

Below follows an introduction on some terminology that is commonly used in this and related fields.

An ad hoc network is put together for a specific purpose and is often, but not always, of a temporary nature. (Ad hoc is Latin and means "for this purpose".) Ad hoc network sometimes refers to any set of networks where the nodes/devices have equal status in the network and are free to associate and/or communicate with any other node/device. Sometimes these nodes/devices are referred to as ad hoc nodes/devices.

A wireless ad hoc network is a decentralized type of wireless network were the nodes/devices communicates wirelessly. Sometimes these nodes/devices are referred to as wireless nodes/devices or wireless ad hoc nodes/devices.

The network is referred to as ad hoc because it does not rely on a preexisting infrastructure, such as base stations, access points or routers, which are normally present in managed (comprising infrastructure) wireless networks like mobile telephony networks. Instead, each node/device participates in routing by forwarding/relaying data for other nodes/devices. The determination of which nodes/devices should forward data to which other nodes/devices is made dynamically based on network connectivity.

A MANET (mobile ad hoc network) is a self-configuring infrastructure-less network of nodes/devices that are mobile and wirelessly connected. Sometimes these nodes/devices are referred to as mobile nodes/devices, wireless nodes/devices or mobile ad hoc nodes/devices. A MANET is a kind of wireless ad hoc network, but a MANET also specifically has to deal with the problems introduced by the mobility of the nodes/devices. Each node/device in a MANET is free to move independently in any direction, and will therefore change its links to other devices frequently. Each device must forward traffic unrelated to its own use, and therefore act as a router. The primary challenge in building a MANET is equipping each device to continuously maintain the information required to properly route traffic. Such networks may operate by themselves or may be connected to the larger Internet.

A mesh network is a network topology in which all nodes/devices cooperate in the distribution of data, typically by each node/device forwarding/relaying data for the network. The nodes/devices in a mesh network are sometimes referred to as mesh nodes/devices.

A mesh network whose nodes/devices are all connected directly to each other is usually referred to as a fully connected mesh network. In this topology it is not necessary to use forwarding/relaying, unless for purposes like redundancy and/or load traffic load distribution.

In a partially connected mesh network, one or more nodes/devices are not connected directly to all other nodes/devices. In a partially connected mesh network forwarding/relaying of messages is necessary in order to allow all nodes/devices to reach all other nodes/devices. This is a very common network topology when the nodes/devices are wirelessly connected.

Ad hoc networks, wireless ad hoc networks and MANETs often use a mesh network topology. The nodes/devices in a mesh network does not necessarily have to be neither mobile nor wirelessly connected. Although the mesh network topology is mostly used in wireless situations, the concept is also applicable to wired networks and software interaction.

The network types, and topology, mentioned above can be designed using a routing technique or a flooding technique. Any of those techniques can incorporate multipath routing. Multipath routing is the routing technique of using multiple alternative paths through a network, which can yield a variety of benefits such as fault tolerance, increased bandwidth, or improved security. Multipath routing can also be referred to as path redundancy and path diversity.

When using a routing technique, a packet/message is propagated along a path, by hopping from node/device to node/device until the destination is reached. To ensure all its paths' availability, a mesh network must allow for continuous connections and reconfiguration around broken or blocked paths, using self-healing algorithms.

In addition to a classic routing technique, the network types can use a flooding technique for forwarding data. Flooding technique in wired networks is usually simple algorithm where every incoming packet/message is sent on every outgoing link except the one it arrived on (when having multiple links). In wirelessly connected networks, it is typically implemented by each node/device simply retransmitting (forwarding/relaying) all incoming packets/messages that are not intended for the node/device itself, in order to relay them to other nodes/devices.

A brief comparison of the two techniques using their most basic or fundamental implementations would be:

A routing technique
- generates less network traffic caused by data transmissions, since the data traffic is sent only via nodes/devices on the paths/routes that will lead to the destination nodes/devices.
- generates network traffic caused by control messages and protocols setting up routes and paths and performing related tasks.
- is quite reliable, since
  - the self-healing capabilities allow the network to continue to operate when a node/device breaks down or a connection goes bad.
  - A multipath routing technique is sometimes implemented.

A flooding technique
- generates more network traffic caused by the data transmissions, since the data traffic is usually forwarded/relayed by all devices in the network.
- generates no, or less, network traffic caused by control messages or protocols to set up routes or paths, simply since these mechanisms are not used, at least not to the same extent and with the same meaning as in a network using a routing technique.
- is simple and robust as there is no need to find and setup any explicit route between a source node/device and a destination node/device, and messages/packets may traverse from the source node/device to the destination node/device over multiple paths/routes, providing inherent diversity against, node/device failures or bad communication.

The terminology in this field is not totally uniquely defined, people sometimes use different terminology for the same thing, or the same terminology for different things.

For the purpose of simplicity we will use the term mesh network to denote any of the above listed network types (ad-hoc network, wireless ad hoc network and MANET) as well as any network having a mesh network topology, be it wireless or wired, with mobile or stationary nodes/devices.

In the same way we will use the term device, to denote an ad-hoc node/device, a wireless node/device, an ad-hoc wireless device, a mobile node/device, a mobile ad hoc node/device, a mesh node/device as well as other names used for devices participating in the networks mentioned above.

The term device includes devices that are only intended for or capable of participating in mesh networks, as well as devices that are intended for, or capable of, participating also in another network, as for example a mobile communications network. When it comes to the latter type of devices, one or more of the devices, or even all devices, could be simultaneously participating in the mesh network and another network. Further, a device that is designed for, or capable of, participating in another network but that for the moment is not, could temporarily or permanently have lost contact with, or for other reasons have chosen, or been ordered, not to operate in, the mobile communications network.

Please note that the term device in the present context denotes devices such as Machine to Machine (M2M) devices, Internet of things (IoT) devices, Device to Device (D2D) devices, relays, sensors, smartphones, mobile phones, user equipment, modems, laptops, tablet computers, surf plates just to mention some examples.

The devices in the present context may be, for example, permanently or temporary mounted on equipment (containers, etc.) or a fixed structure (wall, roof, etc.), portable, pocket-storable, hand-held, computer-comprised, wearable and/or vehicle-mounted mobile devices, just to mention a few examples.

Mobile communications networks are normally multi-purpose networks providing communication capabilities for a variety of communication devices. Mobile communication networks are typically managed by a telecom operator. The communication devices are also commonly referred to as wireless devices, wireless terminals, mobile terminals, mobile stations, user equipment (UE), mobile telephones, cellular telephones etc. These terms can typically be regarded as synonyms, but some of them are also in some contexts used to denote a communication device in relation to a specific telecom standard, but the latter aspect is not of importance in the present context. The communication devices are enabled to communicate wirelessly in a mobile communications network, which could be a cellular communications network or another wireless communication system, sometimes the mobile communications network is also referred to as a cellular radio system, cellular network or mobile telephony network. The communication devices are enabled to communicate voice and/or data, with other entities such as other communication devices, landline telephones and servers, via a Radio Access Network (RAN) and possibly one or more core networks, comprised within the mobile communications network.

A cellular communications network covers a geographical area which is divided into cell areas (or cells). A cell is a geographical area where radio coverage is provided by an access node. Each cell is being served by an access node, or one or more directed beams from an access node.

The access node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each access node may support one or several communication technologies. The access nodes communicate over the air interface operating on radio frequencies with the wireless devices within range of the access node. The term Downlink (DL) denotes the transmission path from the access node to the wireless device. The term Uplink (UL) denotes the transmission path in the opposite direction i.e. from the wireless device to the access node.

In 3rd Generation Partnership Project (3GPP) Long Term Evolution (LTE), access nodes, which may be referred to as eNodeBs or even eNBs, may be directly connected to one or more core networks.

3GPP LTE radio access standard has been written in order to support high bitrates and low latency both for uplink and downlink traffic. All data transmission in LTE is controlled by the radio base station.

Although the idea of enabling D2D (device to device) communications as a means of relaying in cellular networks was proposed by some early works on ad hoc networks, the concept of allowing local D2D communications to use or re-use cellular spectrum resources simultaneously with ongoing cellular traffic is relatively new. Because the non-orthogonal resource sharing between the cellular and the D2D layers has the potential of reuse gain and proximity gain, at the same time increasing the resource utilization, D2D communications underlying cellular networks has received considerable interest in the recent years.

Specifically, in 3GPP LTE networks, LTE Direct, a type of D2D communication, can be used in commercial applications, such as cellular network offloading, proximity based social networking, or in public safety situations in which first responders need to communicate with each other and with people in a disaster area [3GPP TR 22.803].

D2D communication entities (wireless devices) using an LTE Direct link may reuse the same PRB (physical resource block), meaning the time and frequency resources, as used for cellular communications either in the downlink or in the uplink or both. The reuse of radio resources in a controlled fashion can lead to the increase of spectral efficiency at the expense of some increase of the intra-cell interference. Typically, D2D communicating entities use UL (up-link) resources such as UL PRBs or UL time slots, but conceptually it is possible that D2D communications takes place in the cellular DL (down-link) spectrum or in DL time slots.

The main reason for introducing D2D in LTE is to introduce support for NSPS (National Security and Personal Safety) services. One of the main ideas is that devices should be able to communicate with each other also when not in contact with the RAN (radio access network) either temporarily or permanently. Even if D2D communication in LTE might be able to support many services, one of the more important ones seems to be broadcast communication, typically represented by traditional "walkie-talkie" functionality. Basic D2D broadcast communication is one of the services that most likely will be introduced in the close future.

For NSPS service coverage is of major importance. It would typically be important for a group of firefighters to be able to communicate with all the firefighters in a group.

A specially interesting scenario arises when all or some of the NSPS devices lose contact with the RAN, for example being temporarily out of contact with the base stations and thus the rest of the RAN. In this scenario one can imagine that the NSPS devices form a wireless ad hoc network, which can be seen as a temporary network with the purpose of allowing the various NDPS devices to stay in contact with each other, even when not being in contact with the RAN via a base station or access point.

NSPS devices will probably be allowed to use higher TX power than current LTE devices, up to 30 dBm compared to current LTE standard supporting only 23 dBm. This will help to extend the radio coverage for an individual device. But in order to increase the coverage further, given a fixed TX power, it will probably be required to apply some kind of relaying approach. The relaying would allow NSPS devices to reach other NSPS devices, outside its own radio coverage, by using intermediate NSPS devices as relay stations forwarding traffic to NSPS devices further away. The relaying would apply to all different kinds of traffic, examples could be point to point connection oriented traffic between two specific devices, but also traditional walkie-talkie point-to-multi-point functionality directed to multiple devices, most likely implemented as broadcast traffic. Thus there is a need for an efficient relaying method for improved broadcast coverage in a wireless ad hoc network.

In existing mesh communications standards such as IEEE 802.11 Mesh (MAC and PHY layers for WLAN) and IEEE 802.15 (Zigbee) path setup is handled by either proactive or reactive signaling.

Proactive signaling normally use a root node to which all other nodes signal periodically, hence a node always knows the path to root and root always knows the path to all nodes. The periodic signaling requires significant overhead.

Reactive signaling establishes a path upon request when data is to be transmitted. At that instant the path must be found by broadcast signaling to all other nodes in the network, causing significant overhead and possible broadcast storm problems limiting the practical network size.

The initial version of the Bluetooth Low Energy (BLE Mesh, v1.0) specification is a flooding-based mesh network using broadcasting over a set of shared channels referred to as the advertising channels so that other nodes can receive messages and relay these messages. In such a network any device can send a message as long as there is a sufficient density of devices that are listening and relaying messages.

In the BLE Mesh proposal a number of methods are available to restrict the unlimited relaying of messages. One of the most important is the Time-To-Live (TTL). With this method, each message/packet includes a TTL value that limits the number of times that a message can be relayed. The message originator sets a suitable initial value for TTL.

Each time a message is received and then relayed by a device, the TTL value is decremented by one. When the TTL reaches a lower threshold (e.g., 0 or 1), it will not be forwarded further. In the BLE Mesh specification, TTL=0 is used for single hop communication. Packets received with TTL=0 or TTL=1 will not be relayed.

The BLE Mesh network layer packet includes, among others, a source field, a destination field, and a sequence number. There is, however, no explicit means for the source to control the route of the message/packet.

In BLE Mesh it is possible to Ping other nodes (using "Ping TTL request" message). The target node of the Ping message shall then respond with a Ping response (using "Ping TTL status" message), in which the minimum number of hops from the Ping originator node to the Ping target node is included. A node can use this procedure to determine the number of hops it takes to send a message to a destination node and can also determine the number of hops it takes to receive a message from that node. Nodes may use this technique to set a proper TTL of messages transmitted to different destinations.

In a more generalized way Time to live (TTL) or hop limit is a mechanism that limits the lifespan or lifetime of data in a computer or network. TTL may be implemented as a counter or timestamp attached to or embedded in the data. Once the prescribed event count or timespan has elapsed, data is discarded. TTL was originally introduced in computer networking to prevent a data packet from circulating indefinitely.

ISSN 1748-1279 "Area-based beaconless reliable broadcasting in sensor networks" by Fransisco Ovalle-Martinez'et al discusses the use of GPS for determination of neighbors' location and for taking decisions on when to relay.

"The Broadcast Storm Problem in a Mobile Ad Hoc Network" by publisher Mobicom 1999, and author Ni et al. discusses the broadcast storm problem in ad hoc networks.

"On the Reduction of Broadcast Redundancy in Mobile Ad Hoc Networks" by IEEE Proc. MobiHoc 2000, author Peng discusses a broadcast flooding protocol, where use of the source, and relay, transmitter neighbor list is used to decide whether a broadcast should be relayed or not.

"Comparison of Broadcasting Techniques for Mobile Ad Hoc Networks" by publisher Mobihoc '02, and author Williams provides an overview of different routing algorithms, in general the addressed broadcast problem deals with initial broadcasts (ARP eller PREQ) upon which unicast traffic is initialized. Any learning is done from beacon signaling. Network pruning is explicitly done based on beacon signaling. Node distance estimation is computed from path-loss data.

"A Dialogue-based MAC Protocol for Efficient Broadcasting in Ad Hoc Networks" by Mobile and Wireless Communications Summit, 2007 Author Hasegawa propose a broadcast protocol using request/reply dialogue (i.e. feedback signaling) for neighbour identification.

Self-Pruning Broadcasting for Mobile Ad Hoc Networks an article in "Global Telecommunications Conference, 2009. GLOBECOM 2009. IEEE" by author Woon, Yeung discloses mechanism for reducing the collision risk of the relay transmissions by introducing delayed relay based on neighbor information.

SUMMARY

An object of embodiments herein is to provide a method and apparatus facilitating a relaying device (RD) to autonomously determine if it is beneficial that it relays, meaning whether it should relay, user data messages between specific source device (SD) and destination device (DD) pairs (SD-DD-Pairs) in a mesh network implementing a flooding technique.

According to some embodiments herein, in order for a relaying device to be able to determine if it is beneficial to relay user data messages, the relaying device first determines whether it is on any path between a specific source device and a specific destination device. If this is the case, the relaying device further determines whether it is on a short enough path between the two devices according to specific design objectives. If the relaying device is on a short enough path the user data messages will be relayed, otherwise not.

The determination made by the relaying device is based on the analysis of ping messages, ping response messages and user data messages between the source device and the destination device. The ping messages and ping response messages are here considered to be control messages rather than user data messages.

The design objectives state the trade-off between the desired reduction of unwanted user data traffic and the desired level of multipath behaviour. The design objectives are typically implemented by the use of one, or more, design objective parameters.

In some case the design objectives could for example be that it is only desired to relay user data messages on the one or more paths that have a path length that equals the minimum (shortest) path length between the source device and the destination device. Thus minimising the unwanted user data traffic in the network, but achieving a lower level of redundancy.

In another case it might be desired to also relay user data messages on paths that have a path length that are longer than the minimum path length, in order to achieve a higher level of redundancy, on the cost of a lesser degree of minimisation regarding unwanted user data traffic. The design objective parameters could here also control how much longer paths should be used for relaying the user data messages, allowing for a fine tuning of the trade of between the desired multipath behaviour and the desired reduction of unwanted user data traffic.

The design objectives can be fixed (meaning predetermined and not able to change), or dynamic (meaning that they could be changed). Different implementations, could use different design objective parameters and could allow for fixed or dynamic design objectives. Please note that even if the implementation allows for dynamic design objectives, a fixed design objective approach could be taken by always communicating the same values in the design objective parameters.

When the design objectives are fixed the values of the design objective parameters would typically be identical in all relaying devices and during all sessions between all devices (where a session indicates data exchange between two specific devices). The design objective parameters would typically either be hardcoded in the device, decided at manufacturing, decided at configuration or only obtained once for example when initiating the relaying device or initiating the mesh network.

When the design objectives are dynamic the values of the design objective parameters could be different in different relaying devices and during different sessions between different source device destination device pairs. The values could also change over time in the different devices and/or in the different sessions. The values could also be different for different user data messages in a single session.

The relaying device could in different embodiments obtain the values for the design objective parameters from any of the source device, the destination device or another device participating in the network, or even from a device not participating in the network like for example a device accessed within or via a mobile communications network or a fixed landline connection or any other connection besides the connections in the mesh network. In some case the relaying device could itself be the device that decides the values for one or more other devices.

The design objective parameters could, in different embodiments, be obtained from any of the ping message, the ping response message, the user data message or another message. If the design objective parameters are obtained from the ping message (from the source node) or the ping response message (from the destination node) the design objective parameters would typically be valid for all user data messages from the source node to the destination node, until new design objective parameters have been obtained. If the design objective parameters are obtained from a user data message, the design objective parameters would typically be valid for the specific user data message, or possibly for that user data message and following user data messages from the specific source node to the specific destination node until new design objective parameters are obtained.

If the design objective parameters are obtained from another message, any of the two alternatives above could be achieved, depending on the sender of the message, the originator of the information and other parameters.

With the proposed solution, which can be regarded as a modified flooding technique, transmissions of unicast messages in parts of the network that do not contribute to transferring the message from a source device to a destination device is avoided by letting the relaying devices determine whether they are located between a certain source device destination device pair in a mesh network.

Moreover, the proposed method gives a means to control path diversity by tuning one or more design objective parameters. A device located between a certain source device and destination device relays user data messages only if the minimum distance (in number of hops) of any path between SD and DD of which the relaying device is part is (depending on the design objectives) equal to, or not much longer (how much longer is depending on the design objectives), than the distance of the shortest path between SD and DD.

In essence, the proposed solution provides means for reducing the amount of unnecessary traffic compared to what is normally caused in networks using a traditional flooding technique. This, in turn, improves the performance of the network in terms of reduced device power consumption, increased network capacity, and reduced delays.

The various embodiments herein could be summarized as:

A method, being performed by a relaying device, for relaying user data messages originated in a source device intended for a destination device, where the source device, the relaying device and the destination device participates in a mesh network, the method comprising;

receiving a first ping message, originating in the source device intended for the destination device, where the first ping message comprises a first hop counter; and relaying the first ping message by stepping the first hop counter and transmitting the first ping message; and receiving a user data message originating in the source device intended for the destination device; and determining whether the relaying device is on a possible path, indicating that the relaying device is on a path from the source device to the destination device; and determining whether the relaying device is on a short enough path, indicating that the relaying device is on a path from the source device to the destination device that is deemed short enough to justify relaying; and relaying the user data message only if the relaying device is on the possible path and on the short enough path.

Wherein the determining whether the relaying device is on the possible path, in some embodiments comprises;

determining that the relaying device is on the possible path only if the relaying device has received a first ping response message, originating in the destination device, intended for the source device, where the first ping response message is related to the first ping message and comprises a first path length of shortest possible path.

Wherein the determining whether the relaying device is on the short enough path, in some embodiments comprises;

acquiring a shortest distance via the relaying device, indicating the number of hops on a shortest path from the source device via the relaying device to the destination device; and determining that the relaying device is on the short enough path based on at least the shortest distance via the relaying device and the path length of shortest possible path.

Wherein the determining whether the relaying device is on the short enough path, in some embodiments further comprises;

basing the determination on an allowed additional hops value.

Wherein the acquiring the shortest distance via the relaying device in some embodiments comprises;

obtaining the shortest distance via the relaying device from a database in the relaying device.

Wherein the acquiring the shortest distance via the relaying device in some embodiments comprises;

obtaining the shortest distance via the relaying device from another device.

Wherein the acquiring the shortest distance via the relaying device in some embodiments comprises;

transmitting a second ping message intended for the source device; and receiving a second ping response message originating in the source device, intended for the relaying device, where the second ping response message is related to the second ping message and comprises a second path length of shortest possible path, and;

transmitting a third ping message intended for the destination device; and receiving (S1624) a third ping response message (520) originating in the destination device (DD), intended for the relaying device (RD), where the third ping response message (520) is related to the third ping message (510) and comprises a third path length of shortest possible path (526); and determining (S1625) the shortest distance via the relaying device based on the second and third path length of shortest possible path.

Wherein the determining whether the relaying device is on the short enough path, wherein the first ping response message (520) further comprises a remaining distance to source (529) indicating the remaining number of hops from the relaying device (RD) to the source device (SD), in some embodiments comprising;

determining (S1680) that the relaying device (RD) is on the short enough path based on at least the first hop counter and the remaining distance to source.

Wherein the determining whether the relaying device (RD) is on the short enough path, in some embodiments further comprises;

basing the determination on an allowed additional hops value.

Wherein some embodiments further comprising;

relaying the first ping response message, by stepping the remaining distance to source and transmitting the first ping response message.

Wherein some embodiments further comprising;

relaying the first ping response message, by stepping the remaining distance to source and transmitting the first ping response message, only if the relaying device is on the short enough path.

A method, being performed by a relaying device, for omitting relaying user data messages originated in a source device intended for a destination device, where the source device, the relaying device and the destination device participates in a mesh network, the method comprising:

receiving a first ping message, originating in the source device intended for the destination device, where the first ping message comprises a first hop counter; and relaying the first ping message by stepping the first hop counter and transmitting the first ping message; and receiving a user data message originating in the source device intended for the destination device; and determining whether the relaying device is not on a possible path, indicating that the relaying device is not on a path from the source device to the destination device; and not relaying the user data message if the relaying device is not on the possible path.

Wherein the determining whether the relaying device is not on the possible path, in some embodiments comprises;

determining that the relaying device is not on the possible path only if the relaying device has not received a first ping response message, originating in the destination device, intended for the source device, where the first ping response message is related to the first ping message.

A relaying device, for relaying user data messages originated in a source device intended for a destination device, where the source device, the relaying device and the destination device participates in a mesh network, comprising;

a transceiver unit being configured to receive a first ping message, originating in the source device intended for the destination device, where the first ping message comprises a first hop counter; and a controller unit being configured to relay the first ping message by stepping the first hop counter and transmitting the first ping message via the transceiver unit which has been configured to transmit the first ping message; and the transceiver unit being further configured to receive a user data message originating in the source device intended for the destination device; and the controller unit being further configured to determine whether the relaying device is on a possible path, indicating that the relaying device is on a path from the source device to the destination device; and the controller unit being further configured to determine whether the relaying device is on a short enough path, indicating that the relaying device is on a path from the source device to the destination device that is deemed short enough to justify relaying; and the controller unit being further configured to relay the user data message only if the relaying device is on the possible path and on the short enough path.

Wherein the controller unit being configured to determine whether the relaying device is on the possible path, in some embodiments is further configured to;

determine that the relaying device is on the possible path only if the relaying device has received a first ping response message, originating in the destination device, intended for the source device, where the first ping response message is related to the first ping message and comprises a first path length of shortest possible path.

Wherein the controller unit being configured to determine whether the relaying device is on the short enough path, in some embodiments is further configured to;

acquire a shortest distance via the relaying device, indicating the number of hops on a shortest path from the source device via the relaying device to the destination device; and determine that the relaying device is on the short enough path based on at least the shortest distance via the relaying device and the path length of shortest possible path.

Wherein the controller unit being configured to determine whether the relaying device is on the short enough path, in some embodiments is further configured to;

base the determination on an allowed additional hops value.

Wherein the controlling unit being configured to acquire the shortest distance via the relaying device in some embodiments is further configured to;

obtain the shortest distance via the relaying device from a database in the relaying device.

Wherein the controller unit being configured to acquire the shortest distance via the relaying device in some embodiments is further configured to;

obtain the shortest distance via the relaying device from another device via the transceiver unit which has been configured to send and receive the messages to the other device.

Wherein the controller unit being configured to acquire the shortest distance via the relaying device in some embodiments is further configured to;

via the transceiver unit transmit a second ping message intended for the source device; and via the transceiver unit receive a second ping response message originating in the source device, intended for the relaying device, where the second ping response message is related to the second ping message and comprises a second path length of shortest possible path, and;

via the transceiver unit transmit a third ping message intended for the destination device; and via the transceiver unit receive a third ping response message originating in the destination device, intended for the relaying device, where the third ping response message is related to the third ping message and comprises a third path length of shortest possible path; and determine the shortest distance via the relaying device based on the second and third path length of shortest possible path.

Wherein the controller unit being configured to determine whether the relaying device is on the short enough path, wherein the first ping response message further comprises a remaining distance to source indicating the remaining number of hops from the relaying device to the source device;

in some embodiments the controller unit being further configured to determine that the relaying device is on the short enough path based on at least the first hop counter and the remaining distance to source.

Wherein the controller unit being configured to determine whether the relaying device is on the short enough path, in some embodiment further further being configured to;

base the determination on an allowed additional hops value.

Wherein the controller unit being further configured to relaying the first ping response message by stepping the remaining distance to source and transmitting the first ping response message via the transceiver unit in some embodiments being further configured to transmit the first ping response message.

Wherein the controller unit being configured to relay the first ping response message, by stepping the remaining distance to source and transmitting the first ping response message via the transceiver unit in some embodiments being further configured to transmit the first ping response message, only if the relaying device is on the short enough path.

A relaying device, for omitting relaying user data messages originated in a source device intended for a destination device, where the source device, the relaying device and the destination device participates in a mesh network, comprising;

a transceiver unit being configured to receive a first ping message, originating in the source device intended for the destination device, where the first ping message comprises a first hop counter; and a controller unit being configured to relay the first ping message by stepping the first hop counter and transmitting the first ping message via the transceiver unit which is being configured to transmit the first ping message; and the transceiver unit being further configured to receive a user data message originating in the source device intended for the destination device; and The controller unit being further configured to determine whether the relaying device is not on a possible path, indicating that the relaying device is not on a path from the source device to the destination device; and The controller unit being configured to not relay (the user data message if the relaying device is not on the possible path.

Wherein the controller unit being configured to determine whether the relaying device is not on the possible path, in some embodiments is further configured to;

determine that the relaying device is not on the possible path only if the relaying device has not received a first ping response message, originating in the destination device, intended for the source device, where the first ping response message is related to the first ping message.

A computer program which, when run the relaying device causes the relaying device to execute any of the methods in the various embodiments.

A computer program product comprising a computer program according as described above, and a computer readable storage medium on which the computer program is stored.

As stated earlier mesh networks are typically wireless, but could also be implemented with wired technologies. The embodiments herein focus on wireless mesh networks, however the person skilled in the art will realize that the embodiments could equally apply to wired mesh networks.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept will be described, by way of example, with reference to the accompanying drawings, in which:

FIG. 1 is the basis for FIGS. 2 to 9.

FIG. 11 is the basis for FIGS. 12 to 14.

DETAILED DESCRIPTION

As part of developing embodiments herein, some problems of the state of the art will first be identified and discussed.

Using a traditional flooding technique in a mesh network causes serious medium contention, especially for higher traffic intensities and large networks. Specifically, a message transmitted from a source device to a destination device may often cause a significant amount of traffic activity in the network, even in parts of the network that are not at all contributing to the delivery of a message to its destination. Such unnecessary activities consume network resources and often degrade performance with respect to, e.g., message delay, network capacity, and power consumption.

Although setting a proper TTL (often referred to as TTL tuning) limits the problem in some situations, such a solution does still not limit the message forwarding to branches that do not contribute to the message delivery, and in branches that do contribute it only limits the traffic in the end of the branches. It should also be acknowledged, that when there is a large number of hops between the source device and the destination device, the effect of TTL tuning is limited.

The inventive concept will now be described more fully hereinafter with reference to the before mentioned figures, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers and reference symbols refer to like elements throughout the description. Any step or feature illustrated by dashed lines in the flow diagrams should be regarded as optional.

Figure 1:
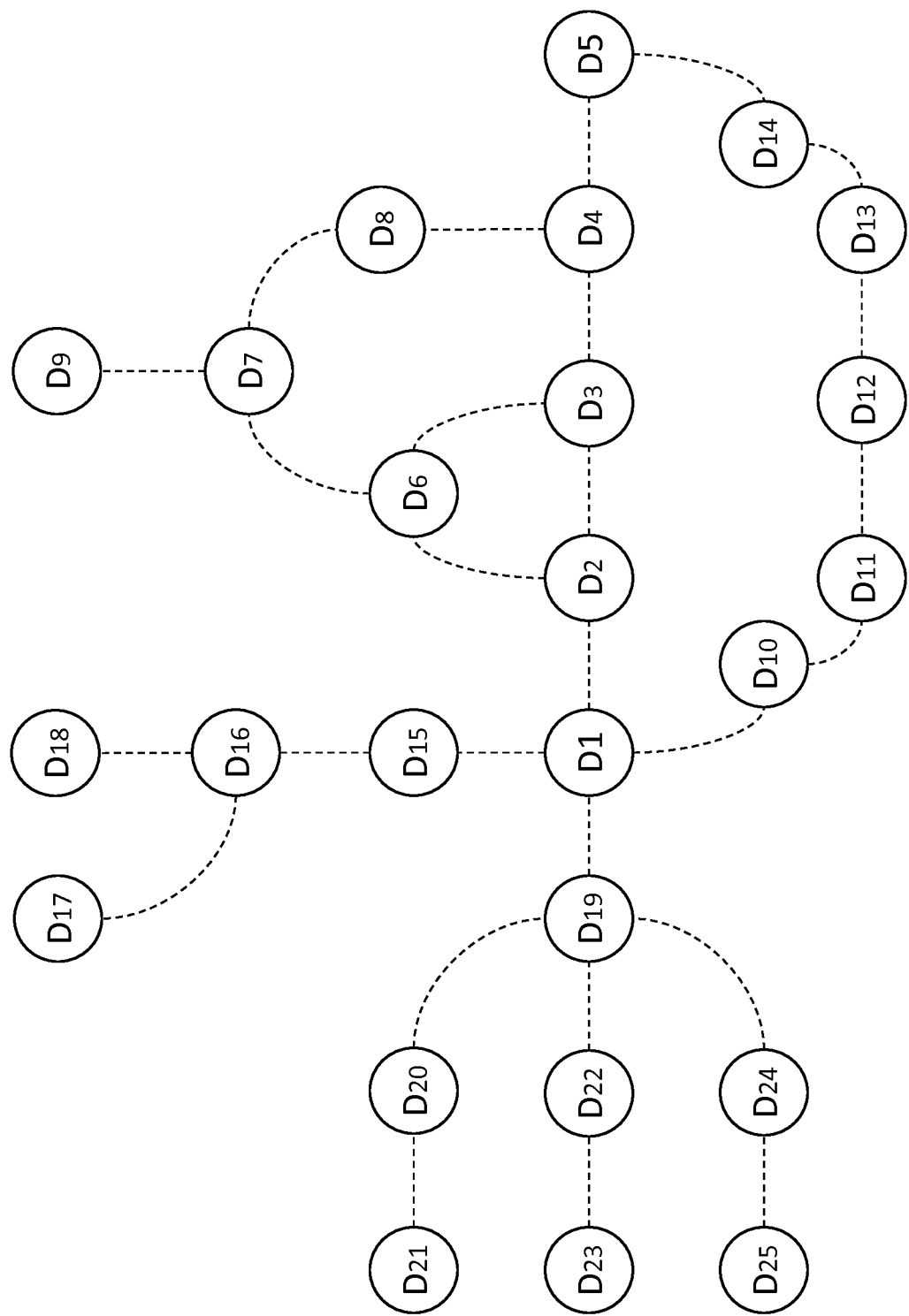
FIG. 1 shows an example of an overview of a mesh network.

FIG. 1 provides an example of an overview of a mesh network. The circles symbolise the devices in the network, D1 to D25, where D1 denotes device 1, etc. The dashed lines symbolise possible communication links between the devices. A possible communication link denotes a communication link where a message that is sent by the device in one end of the communication link can be successfully received by the device in the other end of the communication link. It is also assumed that transmission will also be successful in the reverse direction. In the remainder of this document the shorter term link denotes a possible communication link.

The person skilled in the art would realise that much more complex overview mesh networks could occur. Not only including additional devices, but also including additional links. One such simple but illustrating example could be that D1 could also have a link to D3, which in such a scenario would be illustrated with an additional dashed line between D1 and D3. The person skilled in the art would also realise that in a scenario where the devices are mobile and connected wirelessly, the overview picture provided in FIG. 1 could change over time. An example could be that D17 move from its position and after a while is closer to D21, and in the process D17 would lose the link to D16 but it would gain a new link to D21, this example would then be represented by an accordingly updated figure. The person skilled in the art would also realise that these issues don't affect the methods and apparatuses described in the embodiments herein. Thus the overview of the mesh network is kept complex enough to illustrate the problem and the solution in a generic way, but simple enough to facilitate the understanding. Also to facilitate the understanding, FIG. 1 is the basis for FIGS. 2 till 9.

Figure 2:
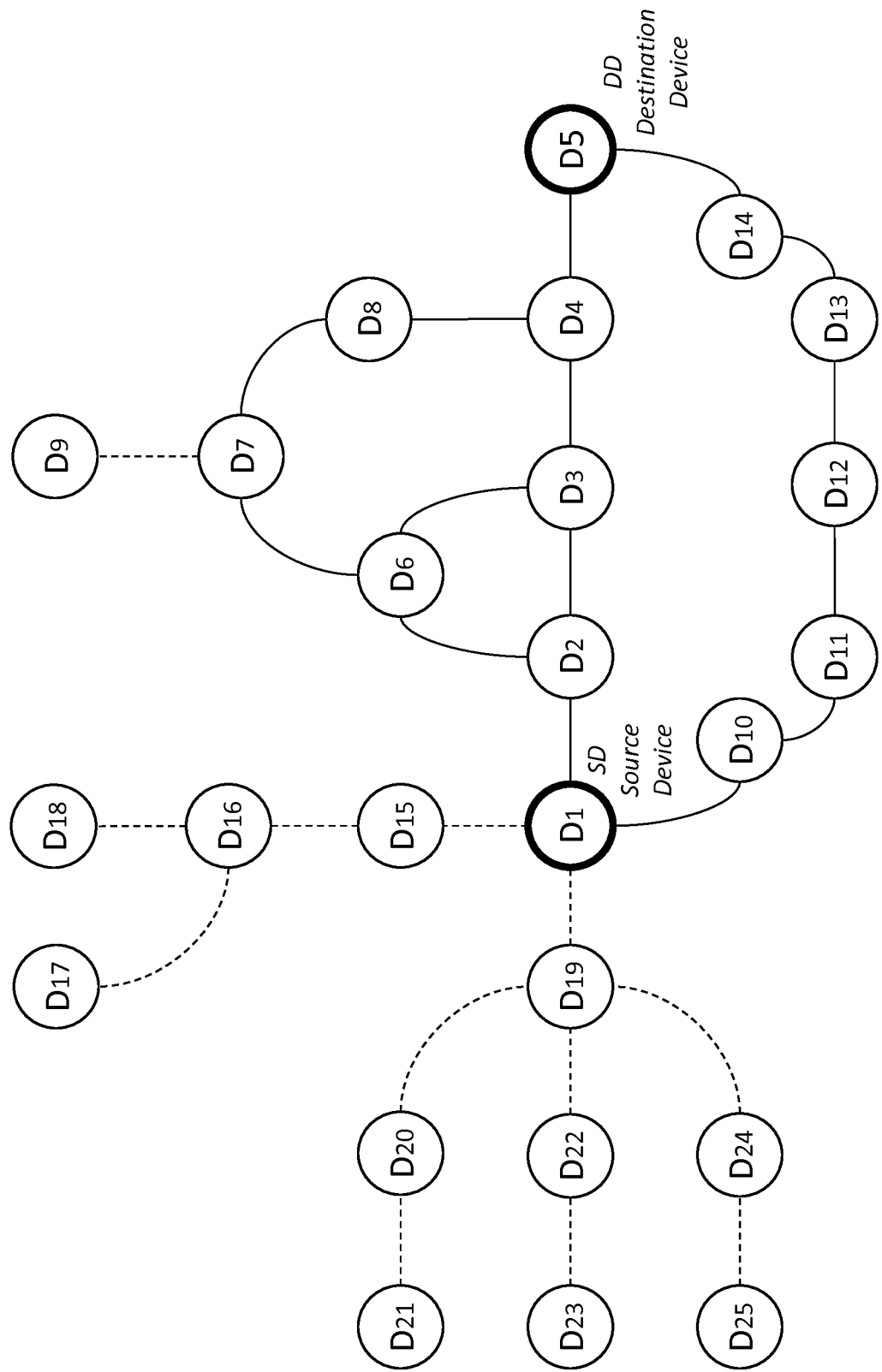
FIG. 2 shows the possible paths from D1 to D5 in the mesh network.

FIG. 2 shows the possible paths from D1 to D5 in the mesh network. The solid lines symbolise links that are on the various possible paths from D1 to D5. The dashed lines symbolise links that are not on any possible path from D1 to D5. Please note that the links drawn with dash lines are still useful for communication between various devices, but it would not be beneficial to use those links for communication between D1 and D5.

Assume that, D1 would like to send a message to D5. In this scenario D1 would be regarded as the source device (SD) and D5 would be regarded as the destination device (DD). One possible way, or path, could be:
  D1 sends the message intended for D5
  D2 will receive it and relay/forward it D3 will receive it and relay/forward it D4 will receive it and relay/forward it D5 will receive it.

Forwarding here means that a device receives a message and realizes that it is not intended for the device itself, thus the device will send the message again with the intention that it will be sent to (or at least towards) the device for which the message is intended. This action is commonly also referred to as relaying. The device could be called either a relaying device or a forwarding device. Throughout this application the term relaying device will be used in a slightly wider sense, also indicating a device that receives a message and realizes that it is not intended for the device itself and then also determines whether it is meaningful, according to one or more criterion, to relay the message, and then relays the message if it is meaningful (and does not relay the message if it is not meaningful). Meaningful would here mean that it would in some way contribute to transmitting the message to or towards the device the message is intended for also taking into account the specific design objectives.

Considering the above, one can identify 4 different possible paths from D1 to D5:

P1 (path 1): D1-D2-D3-D4-D5

P2 (path 2): D1-D2-D6-D3-D4-D5

P3 (path 3): D1-D2-D6-D7-D8-D4-D5

P4 (path 4): D1-D10-D11-D12-D13-D14-D5

In the figure one can see that there are 4 links between device D1 and device D5, if going on the shortest path P1 (D1-D2-D3-D4-D5). The message can be said to make 4 hops on the same path. A hop denotes a transmission over a link.

One could also identify the devices, and links between them, that do not contribute when transmitting data from D1 to D5. Let's for the sake of simplicity divide these devices in branches:

Branches left of D1:
  D19-D20-D21
  D19-D22-D23
  D19-D24-D25
Branches above D1:
  D15-D16-D17
  D15-D16-D18
Branches above D7:
  D9

The embodiments herein describe a distributed traffic control in a mesh network using a flooding technique. This means that the relaying devices determines whether to relay a message or not. In order for a relaying device to be able to determine whether it should relay a message or not from a source device to a destination device, it has to be able to determine the following things:

Whether it is on a possible path (from the source device to the destination device)

Whether it is on a short enough path (from the source device to the destination device)

Let's now introduce some different types of messages:

Ping Message (510)

Ping Response Message (520)

User Data Message (530)

The ping message (510) the ping response message (520) and the user data message (530) and their respective contents will be further explained throughout this description.

Other types of messages or mechanisms can of course also be used, e.g. acknowledgments of user data messages, either as separate messages or piggy backed on other user data messages.

The aim of the embodiments herein is to minimise the transmission of user data messages in the mesh network, while still successfully transferring user data messages from source devices to destination devices. The two main ways of minimising the transmission are, to avoid or minimize transmission in branches that do not contribute to the transmission and to avoid or minimise transmission in redundant possible paths that are considered too long. The determination and decisions will be made in the relaying devices.

The relaying devices will analyse the ping messages (from the source device to the destination device) and the ping response messages, or absence thereof (from the destination device to the source device).

A ping message is typically sent from a source device to destination device to find out, primarily, if the destination device is reachable and available. The destination device will answer with a ping response message. Depending on the contents of the ping message and the ping response message, the source device as well as the relaying devices can determine not only if the destination device is reachable and available, but also other things like e.g. the distance in hops between the two devices.

Different approaches on how to use the ping message and the ping response message could be implemented in different types of network layouts, when using different kinds of network technologies and for different degrees of mobility of the devices, for different quality of the links, etc. The chosen approach or combination of approaches could either be fixed or change over time. Non-limiting examples of approaches on how to use the ping message could be:

Initial Ping. The source device pings the destination device once. It could either ping the destination device before intending to send a user data message to the destination device, or it could ping the destination device even with no immediate intention to send a user data message it.

Ping before each user data message. The source device pings the destination device before intending to send each user data message to the destination device.

Periodic Ping. The source device pings the destination device periodically.

Ping again at detection of unsuccessful data transfer. The source device pings the destination device upon detection of bad data transfer. This could be detected in various ways, the most obvious would that the source device did not receive an acknowledgement for a user data message that was sent.

With any of the approaches described above, at some point in time, before sending a user data message to a destination device, the source device would send a ping message intended for the destination device and wait for one or more ping response messages from the destination device, before sending the user data message.

Any device that overhears and analyses the ping message and the one, or possibly more, ping response messages can determine that it is on a possible path from the source device to the destination device.

In traditional networking the ping response would typically comprise information on the distance from the source node to the destination node, which would allow the source device to set a suitable time to live value for subsequent user data packages. The use of TTL allows for a very crude and limited control of transmissions in the network as described further above.

In different embodiments described herein the relaying device will use one or more design objective parameters, obtained in different ways and from different devices, to be able to provide a better means for reducing the amount of unnecessary traffic and a better means to control path diversity. How this can be achieved will be further elaborated on below.

Figure 3:
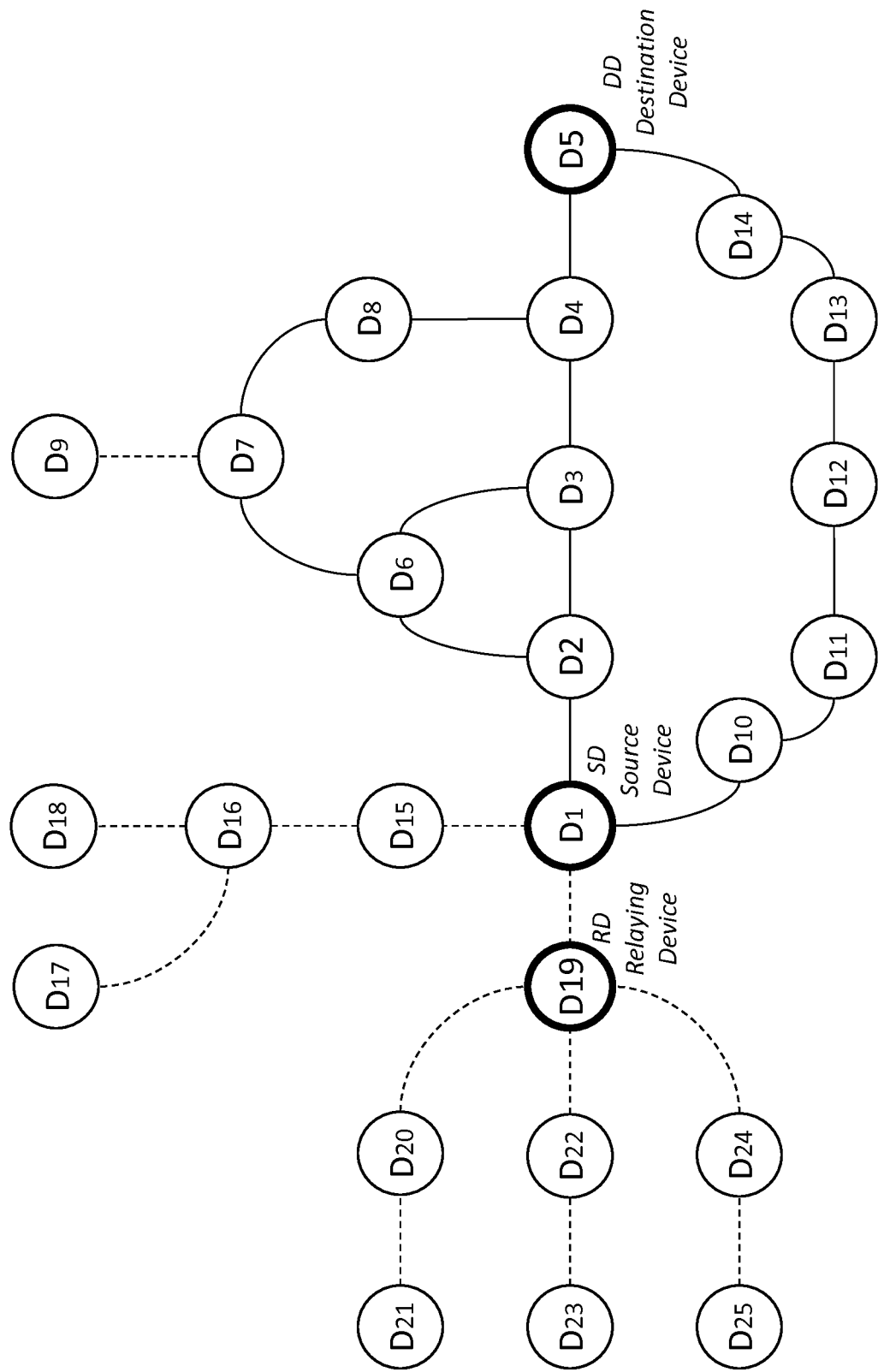
FIG. 3 shows D19 as relaying device (RD) in an impossible path from D1 to D5 in the mesh network.

FIG. 3 shows D19 being the relaying device (RD), D1, being the source device (SD) and D5 being the destination device (DD).

Let's walk through the case when D1 intends to send a user data message intended for D5, focusing on the behaviour of D19 which is not on a possible path from D1 to D5.

A. D1 sends a ping message intended for D5 (when this is done depends on the selected ping approach, as discussed above)

B. The Ping message is received by the following devices which understand they are not the intended receiver, making them relay the ping message.

D2
D10
D15
D19

C. At some point D5 will receive one or more instances of the ping message, being relayed on the possible paths, and will respond with one or more instances of the ping response message D. The ping response message would be relayed back to D1 on one or more of the possible paths (e.g. including D2, but not including D19)

E. D1 would then send the user data message intended for D5, which would be received by the same devices receiving the ping message.

F. D19 would when receiving the user data message:
 a. Determine that the user data message is not intended for D19, thus considering relaying the user data message.
 b. Determine, based on not having received any ping response message associated with the ping message, that it is not on any possible path from D1 to D5
 c. Based on the above, not relay the user data message.

The user data message would thus never reach D20, D22 or D24.

The person skilled in the art would realise that for example D15 would behave in the same way as D19.

Assuming the situation (not indicated in FIG. 3) where there would be additional links between D2 and D19, meaning that D19 would receive the ping response message relayed by D2. In this case D19 would determine that it was on a possible path from D1 to D5 and relay the user data message. The relaying would however be stopped in D20, D22 and D24. In this situation the embodiments herein would be slightly less efficient, but still provide a good minimising effect on unnecessary or unwanted transmission.

Let's make a short comparison with using TTL (Time to Live). Time to live is typically a field in the user data message that states the number of hops the user data message should be allowed to make. Time to live is typically set to a start value of the maximum number of hops allowed and then decreased in every relaying node. Assume that in the mesh network outlined in FIG. 3 D1 has found out that the shortest distance from D1 to D5 is 4 hops. To make sure the user data message reaches D5, D1 could set TTL to 4. This mechanism would however not prevent the user data message from being relayed by the branches that do not contribute to transmitting the user data message to D5. D19 would for example receive the user data message and check the TTL (which would have the value of four) and since TTL would be larger than 0 it would then decrease the TTL value and relay the user data message. The D20 would then receive it and act in the same way. Then D21 would receive it and even D21 would relay it. The same would apply to other devices that are within the same distance from D1 as D4 (meaning 3 hops). This illustrates that TTL does not prevent relaying in parts of the network that do not contribute to the transmission of the data to D5.

Figure 4:
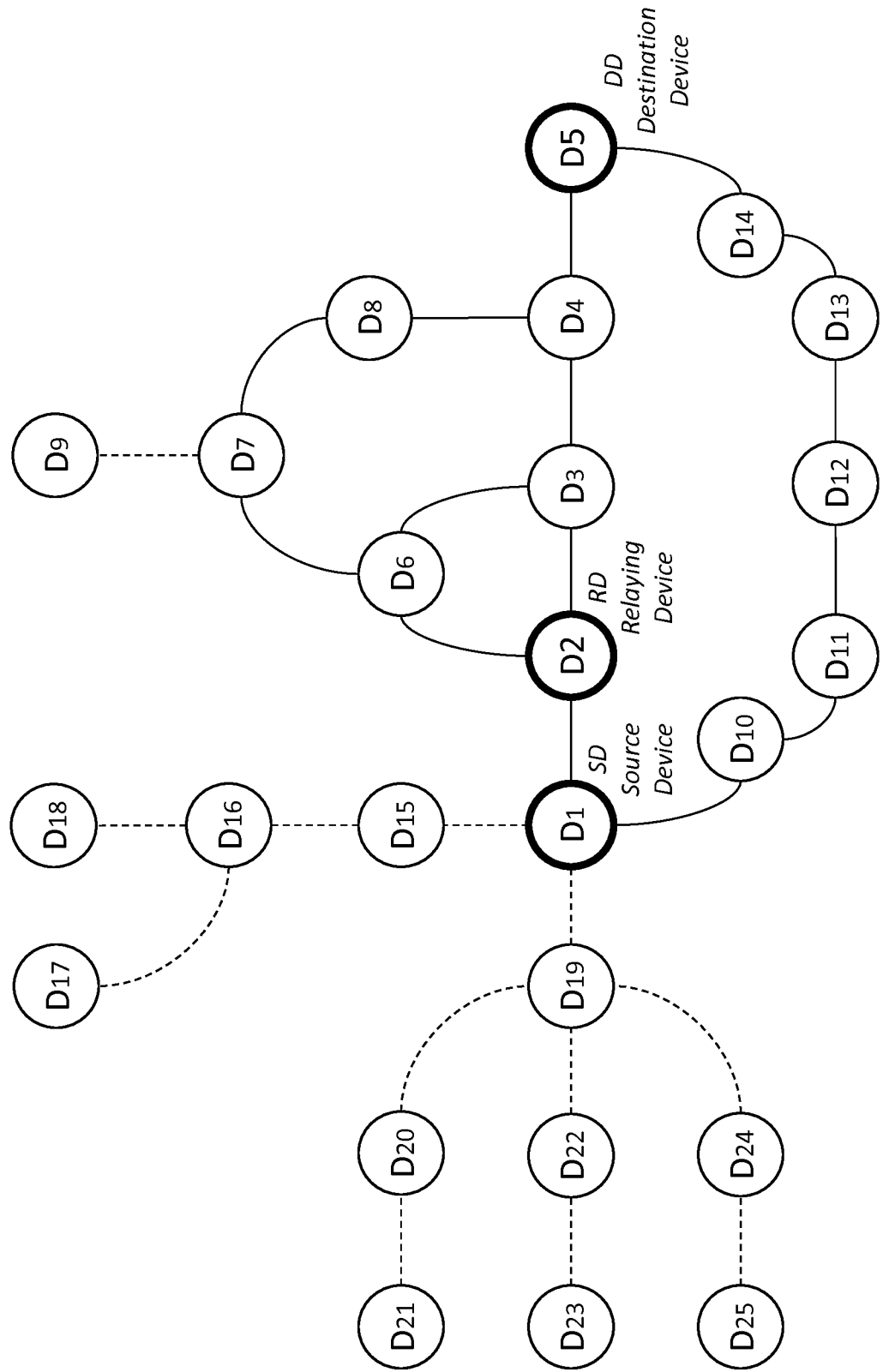
FIG. 4 shows D2 as relaying device (RD) in a possible path from D1 to D5 in the mesh network.

FIG. 4 shows device D2 being the relaying device (RD), device D1, being the source device (SD) and device D5 being the destination device (DD).

Let's walk through the case when D1 intends to send a user data message intended for D5, focusing on the behaviour of D2 which is on a possible path from D1 to D5. ("Identical" below means that the step would be identical to the corresponding step as presented in the discussion of FIG. 3.)

A. Identical
B. Identical
C. Identical
D. Identical
E. Identical
F. D2 would when receiving the user data message:
 a. Determine that the user data message is not intended for D2, thus considering relaying the user data message.
 b. Determine, based on having received a ping response message associated with the ping message, that it is on a possible path from D1 to D5
 c. Based on the above
  i. In some embodiments D2 would relay the message when having determined that it is on a possible path, without making further determinations on whether it is on a short enough path from D1 to D5.
  ii. In other embodiments D2 would also determine whether it is on a short enough path from D1 to D5. If D2 is on a short enough path it will relay the user data message, the user data message would thus reach D3 and D6. If D2 is not on a short enough path, it will not relay the user data message. How to determine whether a relaying device is on a short enough path from the source device to a destination device will be discussed further below in this description.

The person skilled in the art would realise that the other devices (except the destination device) on the possible paths would behave in the same way as D2 in the above situation.

Figure 5:
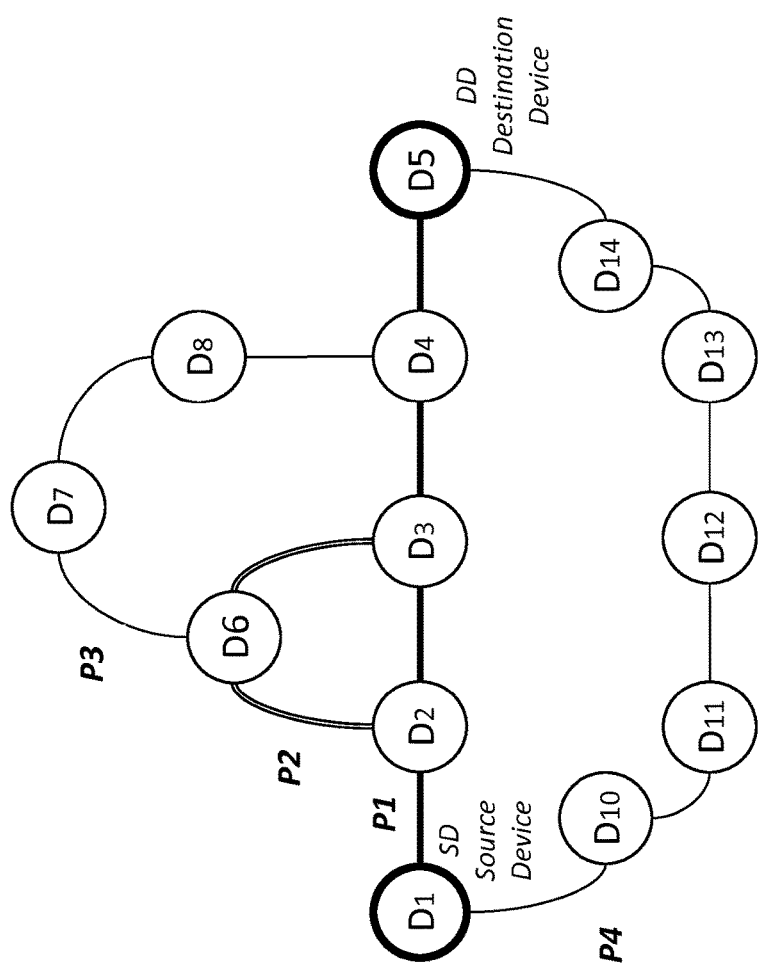
FIG. 5 shows the distances from devices to the source device in some different possible paths from D1 to D5 in the mesh network.

FIG. 5 shows the distances from devices to the source device in different possible paths from D1 to D5 in the mesh network. The distance is counted in number of hops towards the source device.

The figure illustrates some interesting facts:
Different devices will be at different distances from the source device. D2 and D10 (both being at the distance of 1 hop) will for example be closer to D1 than the other devices.
A device can be on multiple possible paths. D2 and D4 are for example on three possible paths (P1, P2 and P3)
A device being on multiple possible paths can have different distances to the source device on each possible path.
D2 has the following distances to the source device.
 1 on P1, P2 and P3.
D4 has the following distances to the source device.
 3 on P1, 4 on P2 and 5 on P3.
D5 has the following distances to the source device.
 4 on P1, 5 on P2, 6 on P3 and 6 on P4).

Please note that to make the table simpler to understand the path P4 has been excluded. The person skilled in the art will be able to draw the corresponding conclusions regarding P4.

Figure 6:
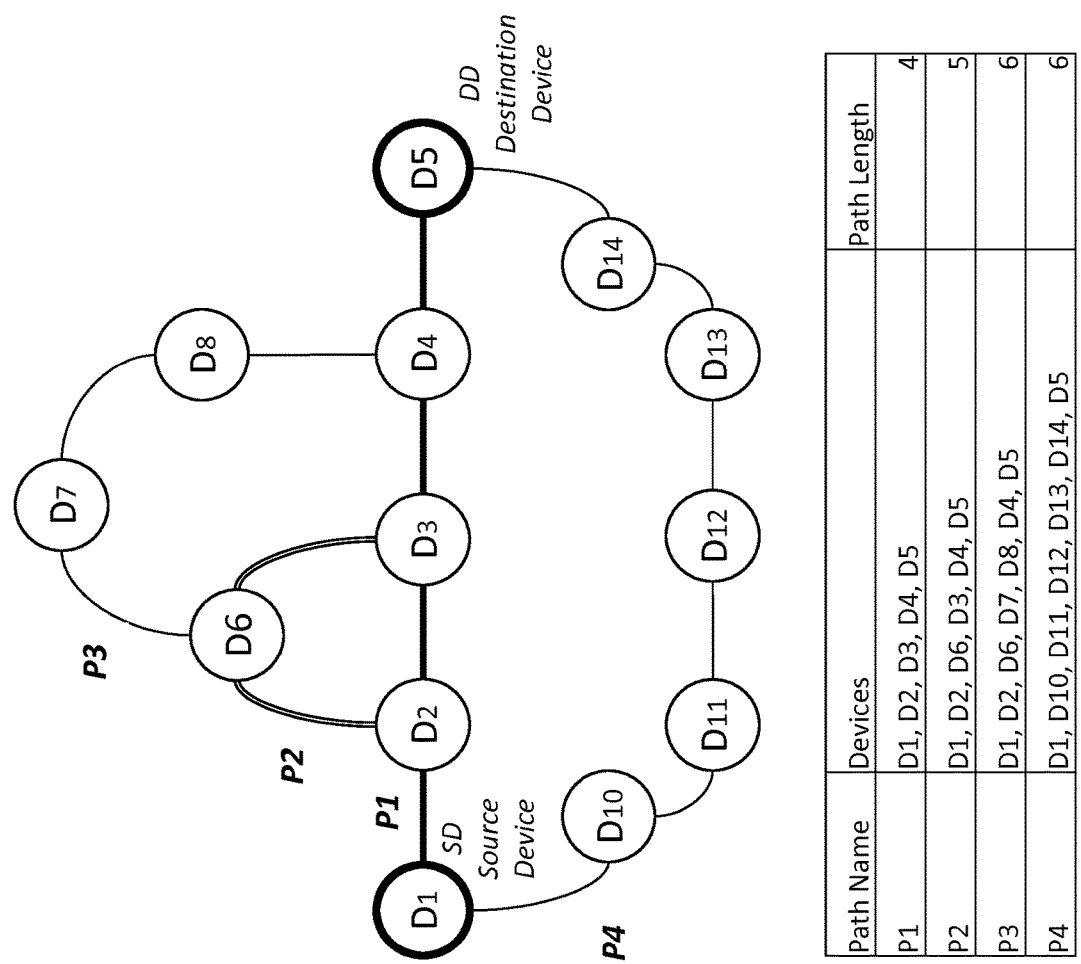
FIG. 6 shows the path lengths for the possible paths from D1 to D5 in the mesh network.

FIG. 6 shows the path lengths for various possible paths from D1 to D5 in the mesh network. The path length is the distance in hops from the source device to the destination device (and vice versa).

P1 has the path length of 4
P2 has the path length of 5
P3 has the path length of 6
P4 has the path length of 6

Figure 7:
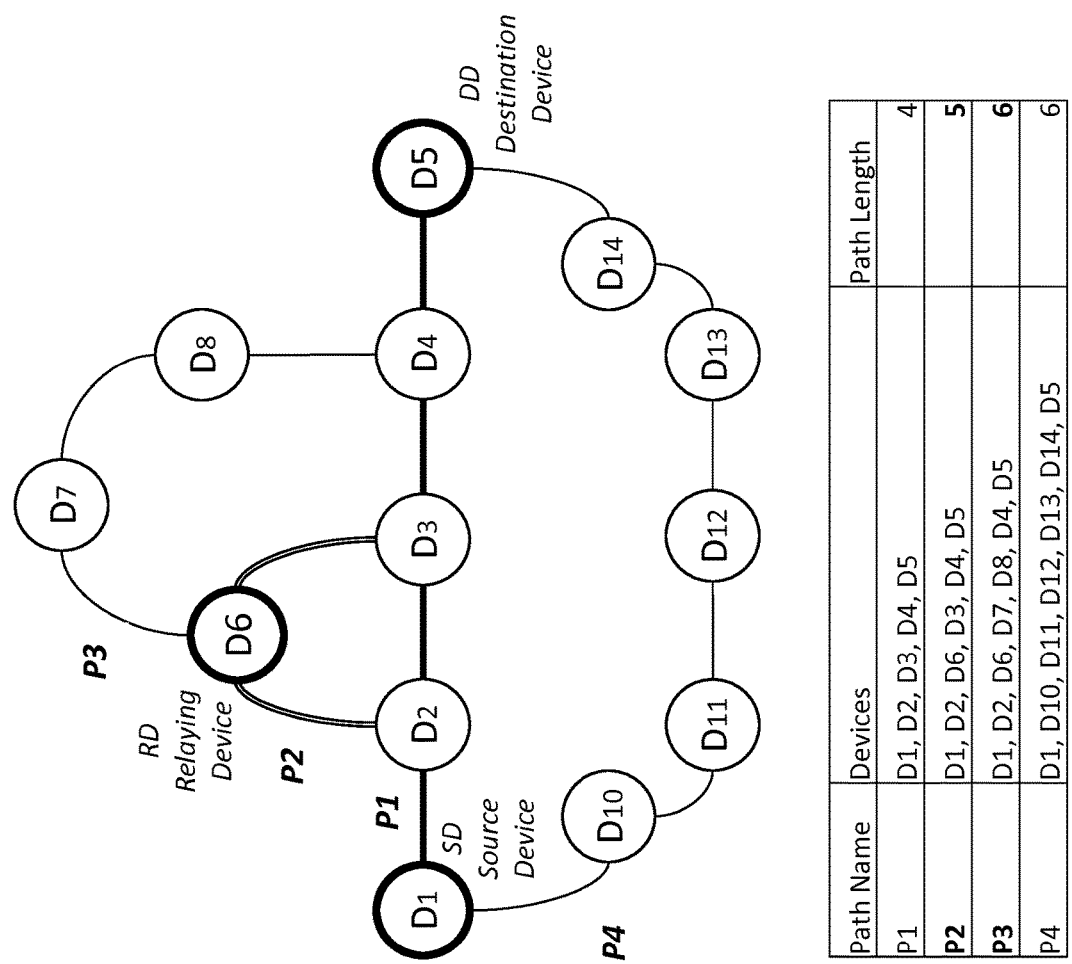
FIG. 7 shows D6 as relaying device (RD) when relaying based on path length.

FIG. 7 shows D6 as relaying device (RD) when relaying based on path length. The description below also refers to FIG. 10, outlining the message formats.

Assuming in analogy with the embodiment described when discussing FIG. 4 that D6 has determined that it is on a possible path. In some embodiments, D6 also will determine whether it is on a short enough path before deciding whether to relay a user data message. In this way, it will further participate in and contribute to controlling the amount of transmissions generated for the user data message in the mesh network.

As has been discussed above, there are four possible paths, with 3 different path lengths (4, 5 and 6). The shortest possible path is P1, and the path length of the shortest possible path is 4. As discussed above, there are benefits and drawbacks of relaying user data messages in all possible paths (paths with path lengths of 6 and lower). The reverse benefits and drawbacks apply when relaying user data messages only in the shortest possible path (paths with path lengths of 4). A middle scenario would be achieved if relaying user data messages on paths with path lengths of 5 and lower.

By setting a maximum allowed path length for relaying, the transmission of user data messages through the different possible paths could be controlled and the system could be tuned with respect to desired redundancy. The maximum allowed path length for relaying would have to be set in relation to the shortest possible path. The maximum allowed path length for relaying would be set as the path length of the shortest possible path plus allowed additional hops. Where allowed additional hops would be a value bigger than or equal to zero. By setting allowed additional hops to zero only devices on the shortest possible path would relay user data messages. Increasing the allowed additional hops would cause user data messages to be sent in additional possible paths.

For a relaying device to determine that it is on a short enough path it would need to know two things.

The maximum allowed path length, for relaying
  which is the sum of:
    the path length of the shortest possible path
    the allowed additional hops
The shortest distance via the relaying device
  which is the length of the shortest path that the relaying device is part of. D6 is part of two paths:
    P2 (with a path length of 5)
    P3 (with a path length of 6)

Here the maximum allowed path length as well as the allowed additional hops (which is part of the maximum allowed path length), are regarded as designed objective parameters.

If the maximum allowed path length for relaying would be equal or greater than the shortest distance via the relaying device, the relaying device would determine it was on a short enough path. If the relaying device is on a short enough path it would relay the user data message, otherwise not.

For a relaying device to find out the maximum allowed path length, for relaying, it would need to obtain either the maximum allowed path length directly, or to obtain the path length of the shortest possible path and the allowed additional hops separately and then add them.

To describe how any device on any possible path could obtain the path length of the shortest possible path, it is appropriate to discuss some details on how to relay the ping message and a few different approaches for the destination device to send ping response messages.

In the scenario described in FIG. 7 the source device D1 will send a ping message intended for the destination device D5. This ping message will be relayed in the different paths. Assuming all transmissions succeed the ping message (or copies or instances thereof) will be received 4 times by the destination device.

To allow for calculation of the path length of the shortest possible path, the source device D1 will set a hop counter, 515, in the ping message, 510, to a start value. The start value could be any value (as long as all devices agree on the start value) but for the sake of simplicity we assume it is set to 0 (zero), indicating that no successful hop been made yet. Each relaying device will then step the hop counter, 515, before relaying the ping message, to indicate that one more successful hop has been made. The stepping could be done either by incrementing or decrementing the hop counter, 515, by any value (as long as all devices agree on the mechanism) but for the sake of simplicity we assume it will be incremented by 1 (one). In this way when the destination device will receive the 4 ping messages, the hop counters in the different ping messages will be 3, 4, and 5 when the destination device receives them.

The hop counter could be implemented by using a dedicated field, 515, in the ping message as described above. The hop counter could in some implementation be calculated from TTL, thus minimising the number of fields in the ping message. In this latter case the involved devices would have to know the start value of TTL. In its simplest form all devices could use the same start value for TTL. TTL will be stepped for each hop made when traversing the network. The relaying units could then calculate the number of hops (corresponding to the hop counter) from the start value of TTL and the value TTL has when arriving at the relaying device.

In one embodiment, the destination device will determine the path length of the shortest possible path by waiting, by for example using one or more timers, to be able to receive all ping messages. The destination node can in this way calculate that the path lengths of the possible paths are 4, 5, and 6. It can then also calculate that path length of the shortest possible path is 4. The path length of the shortest possible path will then be communicated back to all the relaying nodes as well as the source node. This will be done in the path length of the shortest possible path field, 526, in the ping response message, 520.

In another embodiment, the destination device could make the determination based on the assumption that the first ping message to arrive was transmitted via the shortest path thus representing the shortest distance. The path length of the shortest possible path will then be communicated back to all the relaying nodes as well as the source node. This will be done in the path length of the shortest possible path field, 526, in the ping response message, 520. Please note that in some networks and situations, due to the radio conditions, the delay caused internally in devices and other delays this approach might not cause reliable results. Maybe in some situation the ping message arriving on the second shortest possible path, or any other path, could arrive first in time. The person skilled in the art will realise that using, for example, the path length of the second shortest possible path instead of the path length of the shortest possible path would be less ideal. It would however maybe not happen too often. How this would be implemented depends on the desired behaviour of the system.

In yet another embodiment, the destination device could send one ping response message for each received ping message. Here the determination of the shortest possible path would be left to the source device, or possibly all devices on all the possible paths. The path lengths of each of the paths will then be communicated back to all the relaying nodes as well as the source node. This will be done in the path length of the shortest possible path field, 526, in the ping response message, 520.

Based on the above the maximum allowed path length can be determined, and the information can be distributed, in a few different ways.

In some embodiments, the destination device (DD) determines the path length of the shortest possible path based on one or more of the received ping messages, either by waiting for all ping messages or by assuming that the first ping message received represents the shortest path as described above. The destination device (DD) can then communicate any of the following alternatives in the ping response message (520), in the fields as indicated:
  The path length of the shortest possible path (526)
    This would lead to that all devices in all possible paths would obtain this information.
  The maximum allowed path length could then be obtained by the relaying devices in either of the following ways:
    The source device (SD) transmitting either or both, of the following in a user data message (530):
    the maximum allowed path length (537)
    the allowed additional hops (538)
      This would lead to that all devices in all the possible paths would be able to calculate the maximum allowed path length.
    The relaying device could obtain the allowed additional hops in any of the following ways (allowing it to calculate the maximum allowed path length):
      The allowed additional hops could be preconfigured in the relaying device.
      The allowed additional hops could have been received already in the in the allowed additional hops (518) field in the original ping message (510).
      The allowed additional hops could be, or already have been, obtained from another device in another message.
  The maximum allowed path length (527)
    This would lead to that all devices in all the possible paths would obtain the necessary information.
  The path length of the shortest possible path (526) and the allowed additional hops (528)
    This would lead to that all devices in all the possible paths would be able to calculate the maximum allowed path length.

In some other embodiments, the source device (SD) determines the path length of the shortest possible path based on one or more of the received ping response messages (520), either by waiting for all the ping response messages or by assuming that the ping response message that is received first ping response message represents the shortest possible path. (The skilled person in the art would realise that this will be done in analogy with how the destination device (DD) could determine the path length of the shortest path as described above.) The maximum allowed path length could then be obtained by the relaying devices by either any of the following alternatives:
  The source device (SD) transmitting any combination of the following in a user data message (530):
    the maximum allowed path length (537)
      This would lead to that all devices in all the possible paths would obtain the necessary information.
  The path length of the shortest possible path (536)
    Here the relaying device could obtain the allowed additional hops in any of the following ways (allowing it to calculate the maximum allowed path length):
      The allowed additional hops could be preconfigured in the relaying device.
      The allowed additional hops could have been received already in the allowed additional hops (518) field in the original ping message (510).
      The allowed additional hops could be, or already have been, obtained from another device in another message.
  The path length of the shortest possible path (536) and the allowed additional hops (538)
    This would lead to that all devices in all the possible paths would be able to calculate the maximum allowed path length.

In yet some other embodiments, the relaying device (RD) determines the path length of the shortest possible path based on one or more of the received ping response messages (520). (The skilled person in the art would realise that this will be done in analogy with how the destination device (DD) could determine the path length of the shortest path as described above.) The maximum allowed path length could then be obtained by the relaying device by any of the following alternatives:
  The source device (SD) transmitting any combination of the following in a user data message (530):
    the maximum allowed path length ( )
      This would lead to that all devices in all the possible paths would obtain the necessary information.
    The allowed additional hops (538)
      This would lead to that all devices in all the possible paths would be able to calculate the maximum allowed path length.
  The device could obtain the allowed additional hops in any of the following ways (allowing it to calculate the maximum allowed path length):
    The allowed additional hops could be preconfigured in the relaying device.
    The allowed additional hops could have been received already in the in the allowed additional hops (518) field in the original ping message (510).
    The allowed additional hops could be, or already have been, obtained from another device in another message.

The text above describes various ways for a device to find out the maximum allowed path length, the text below describes how a relaying device can find out the shortest distance via the relaying device.

As has been mentioned above, the shortest distance via the relaying device is the path length of the shortest possible path, between the source device and the destination device, that the relaying device is part of.

In this example, as FIG. 7 shows, D6 is part of two possible paths, P2 (with a path length of 5) and P3 (with a path length of 6). Here the shortest distance via the relaying device is 5 (which is the path length of P2).

In different embodiments herein, the relaying device could obtain the shortest distance via the relaying device in different ways. (Here one has to keep in mind that the shortest distance via a relaying device does not necessarily have the same value as the path length of the shortest possible path.)

One way to calculate the shortest distance via the relaying device is to sum the following two distances:

The shortest distance from the relaying device to the source device

The shortest distance from the relaying device to the destination device

As a generalization of the above formula it can be said that the shortest distance via the relaying device can be calculated from path lengths of different sub paths of the shortest path that the relaying device is part of. P2 in FIG. 7 can for example be divided into two sub paths (D1-D2-D6 and D6-D3-D4-D5), but it could also be divided in many other ways, another example would be to divide it into 5 sub paths (D1-D2, D2-D6, D6-D3, D3-D4, D4-D5).

In one embodiment the shortest distance via the relaying device (or the necessary path lengths of some sub paths to be able to calculate it) are stored in the relaying device.

In another embodiment the above information is stored in another device. The relaying device would in this case have to obtain the information from the other device.

In yet another embodiment the necessary path lengths of some sub paths to be able to calculate the shortest distance via the relaying device is distributed between device. The relaying device would in this case have to obtain some or all of the path lengths from one or more other devices.

Going back to the case of calculating the shortest distance via the relaying device by adding the shortest distance from the relaying device to the source device and the shortest distance from the relaying device to the destination device.

The distances or lengths of each of the sub paths, can be obtained in two different ways. Let's take the shortest distance from the relaying device to the source device as an example. This distance could be obtained if the source device pings the relaying device (either just with the intention to find out the shortest distance between the two devices, or with the intention to see if the relaying device can be reached with the intention to send data to the relaying device). The same distance could be obtained if instead the relaying device pings the source device (with the same possible intentions as discussed in the reverse case above).

The distances of the two sub-paths could be obtained beforehand or on demand (when needed). The relaying device could store information related to when it has pinged other devices and when it has been pinged by other devices. The relaying device could also have a mechanism or logic for deciding if and how long such stored information is valid. In some networks, when for example the positions of all or most of the devices are fixed geographically (for example sensors in a factory) or when the relative distances are fixed (for example sensors on containers on a ship that is moving), the values might be valid for a long time. In other types of networks where the devices have a higher degree of mobility the values might be valid for a significantly shorter amount of time. If the values are still valid they can be used, if they are no longer valid new values would have to be obtained.

Figure 13:
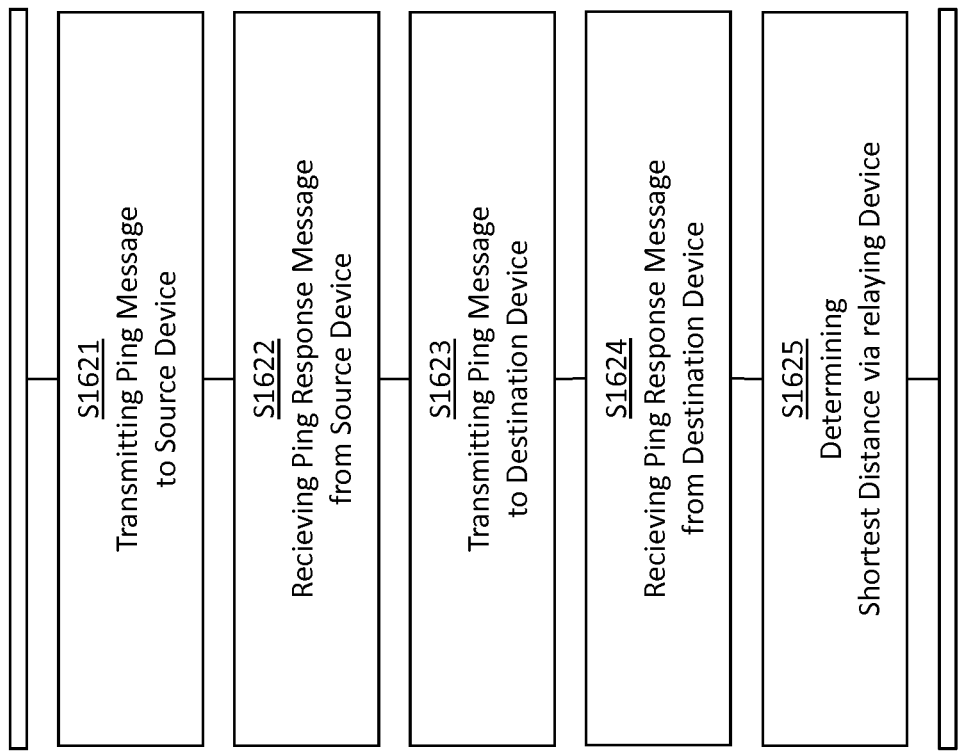
FIG. 13 is a flow flowchart depicting embodiments of a method in a relaying device for acquiring the shortest distance via the relaying path using pinging.

Below is outlined in more detail the case when the relaying device obtains the shortest distance via the relaying device by pinging the source device and the destination device. This means that the relaying device would obtain the shortest distance from the relaying device to the source device by pinging the source device, and obtain the shortest distance from the relaying device to the destination device by pinging the destination device, and then add the two distances. This is illustrated in FIG. 13.

S1621 shows the relaying device initiating the pinging of the source device by transmitting a ping message (510) to the source device.

S1622 shows the relaying device receiving a ping response message from the source device (520), the ping response message (520) being associated with the ping message (510) sent in S1621. The ping response message (520) contains the path length of the shortest possible path (526), representing the distance between the relaying device and the source device.

S1623 shows the relaying device initiating the pinging of the destination device by transmitting a ping message (510) to the destination device.

S1624 shows the relaying device receiving a ping response message from the destination device (520), the ping response message (520) being associated with the ping message (510) sent in S1623. The ping response message (520) contains the path length of the shortest possible path (526), representing the distance between the relaying device and the destination device.

S1625 shows the determining of the shortest distance via the relaying device. This determination would be done by simply adding the two distances that were obtained from the shortest possibly path in the ping response messages.

A few things have to be clarified about the description above and FIG. 13.

The steps in FIG. 13 do not necessarily have to happen in the order as shown in the picture. The person skilled in the art will realize that; which device is pinged first and in which order the ping response messages are received does not affect the logic or the calculations.

The person skilled in the art will also realise that the description, in relation to FIG. 6, describing different ways for different equipment to determine the shortest possible path length also applies to the description above, meaning e.g. that the device responding, with a ping response message, to the ping message could make the determination only sending one ping response message, or that the device initiating the ping sequence could make the determination thus possibly receiving multiple ping response messages. Please refer to the description related to FIG. 6 for more details.

The different distances and other relevant information obtained in this way could be stored in the relaying device for future/later use.

The shortest distance via the relaying device could also be obtained by overhearing and analyzing ping and ping response messages between other nodes in the network and the SD and DD.

According to the logic described above the relaying device can find out the maximum allowed path length and the shortest distance via the relaying device. If the shortest distance via the relaying device is less or equal to the maximum allowed path length it would mean that the relaying device is on a short enough path, otherwise not. If the relaying device is on a short enough path a user data message from the source device to the relaying device will be relayed, otherwise not.

When using the method and apparatus suggested in the embodiments herein, the filtering will be done as soon as possible in the paths, and a high degree of unnecessary relaying will be minimised.

As an example, if the allowed additional hops equals 1 it would mean that the maximum allowed path length, for relaying will be 5. In path P3 already device D7 would determine it was not on a short enough path and would not relay the user data message. In path P4 already device D10 would determine it was not on a short enough path and would not relay the user data message.

Let's again make a short comparison with using TTL (Time to Live). Assume D1 knows that the shortest distance from D1 to D5 is 4 hops.

As an example, to make sure the user data message reaches D5, D1 could set TTL to 4. This would mean that in path 3 D7 would relay the user data message allowing it to reach D8. In path 4 D10, D11 and D12 would relay the user data message allowing it to reach D13.

As another example D1 could set TTL to 5, with the intention of using TTL to achieve some additional multipath behaviour. This would mean that in path 3 D7 and D8 would relay the user data message allowing it to reach D4. In path 4 D10, D11, D12 and D13 would relay the user data message allowing it to reach D14.

The above examples illustrate that using TTL will achieve some filtering, but one can also see that the filtering will be achieved at the end of the paths. This means that some unnecessary relaying would be done, meaning that user data messages would be relayed even in parts of paths where it would be blocked at the end of the paths. In both examples in path 3 D7 would relay the user data messages when in fact the relaying they do will not contribute to the successful transmission of the user data message to D5. In path 4 it would be even worse, here several devices would relay the user data message to no benefit. Here one can see that the performance according to the method and apparatus suggested in the embodiments herein would here be significantly better than if using TTL.

Figure 8:
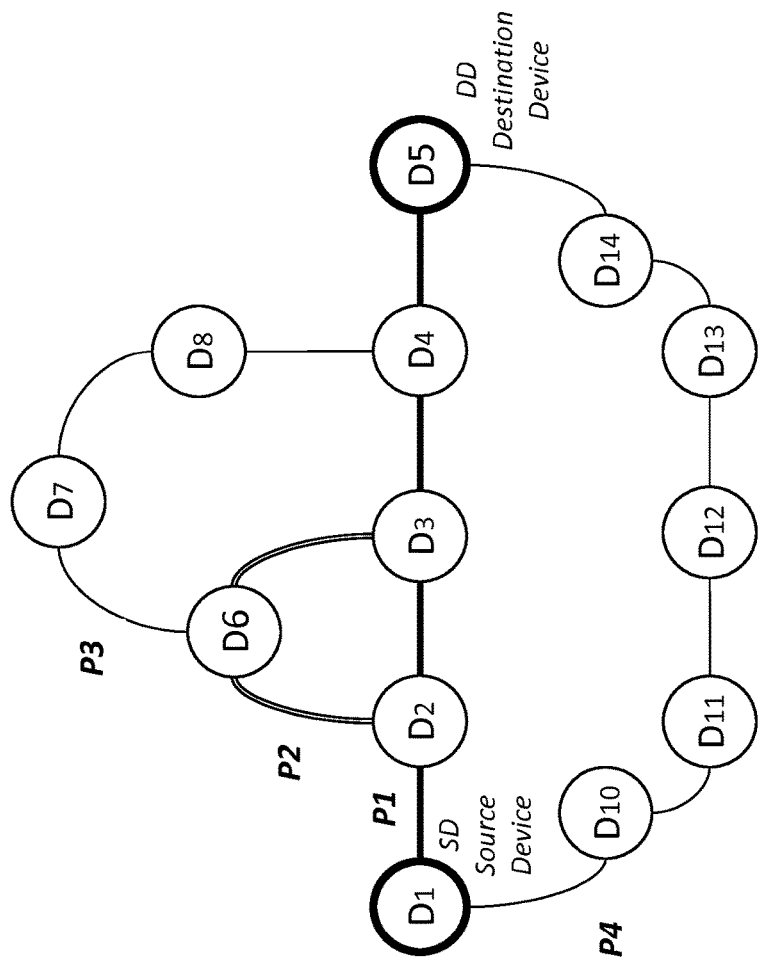
FIG. 8 shows the allowed remaining distance to source, ARDTS, for various possible paths from D1 to D5 in the mesh network.

FIG. 8 introduces ARDTS (allowed remaining distance to source). The introduction of ARDTS allows for an alternative way for a relaying device to determine if it is on a short enough path.

ARDTS states the allowed remaining distance to source, meaning the allowed remaining distance from the relaying device to the source device, when relaying a ping response message (520) from the destination device intended for the source device. Please note that ARDTS is not primarily intended to allow the relaying device to determine whether the ping response message as such should be relayed (even if it in some embodiments could be used to filter such relaying). Instead ARDTS is mainly intended to allow the relaying device to understand if it is on a short enough path or not, allowing the relaying device to determine whether it should relay a user data message from the source device to the destination device.

As a comparison, the solution described further above, with reference to FIG. 7, was based on that, for a relaying device to be able to determine that it is on a short enough path it would need to know two things.

Figure 9:
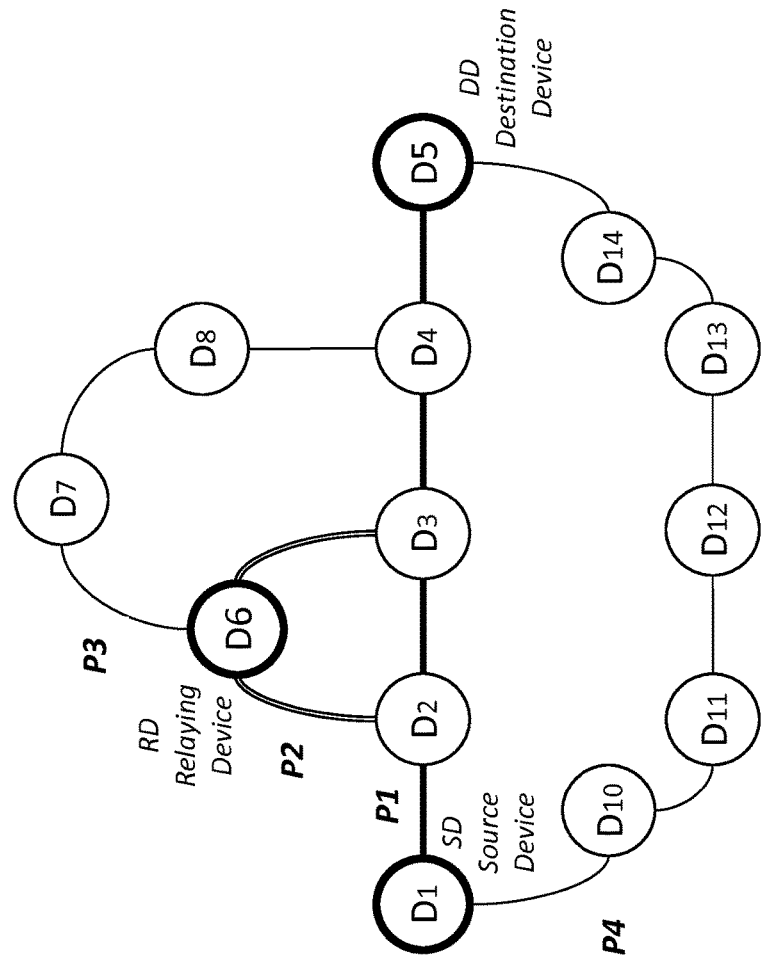
FIG. 9 shows D6 as relaying device (RD) when relaying based on allowed remaining distance to source, ARDTS.

The maximum allowed path length
   a which is the sum of:
      the path length of the shortest possible path
      the allowed additional hops
The shortest distance via the relaying device The solution described here, with reference to FIGS. 8 and 9, is based on that, for a relaying device to be able to determine that it is on a short enough path it would need to know two things.

The allowed remaining distance to source (ARDTS)
   a which is the sum of:
      the remaining distance to source (RDTS) on the shortest possible path
      the allowed additional hops
The shortest distance between the source device and the relaying device If ARDTS is greater than or equal to the shortest distance between the source device and the relaying device, then the relaying device is on a short enough path, otherwise not ARDTS (allowed remaining distance to source) has different values in different devices. It has the highest value (the start value) in the destination device, where it corresponds to the maximum allowed path length. ARDTS is decreased by one for each relaying device that is one step closer to the source device.

ARDTS (allowed remaining distance to source) is based on a related value RDTS (remaining distance to source). RDTS is carried in the RDTS (remaining distance to source) field in the ping response message. The relationship between ARDTS and RDTS is elaborated on further below, in relation to FIG. 9.

The shortest distance between the source device and the relaying device also has different values in different nodes. The value can be obtained from the hop counter in the ping message (the hop counter is discussed in detail in the description related to FIG. 7).

As can be seen above the two solutions are based on the same principle; that the maximum allowed path length (the path length of the shortest possible path plus the allowed additional hops) reflects the design objectives. It is purely a matter of two slightly different ways of distributing different parameters between the devices, to allow a relaying device to determine whether it is on a short enough path, meaning that it should relay a user data message, or not.

The table in FIG. 8 shows ARDTS values for three different cases with three different design criteria. To make the table less complex, and thus easier to understand as an introduction, it only shows ARDTS values for devices that are part of path P2 (D1-D2-D6-D3-D4-D5). To further simplify things the table also only shows the ARDTS values that can be derived from ping response messages received via path P2. (Devices that are part of path P2 could also be part of other paths and could also receive ping response messages through these other paths.)

The three lower rows, starting with P2 in the first column, shows the three different cases, one case per row. The different design criteria relate to using different values for the maximum allowed path length. The maximum allowed path length is the start value for ARDTS which applies to the destination device.

The first row shows the example when the maximum allowed path length is set to "the path length of the shortest possible path", which in this example is 4. This means that only devices that are on a path with the path length of 4 should relay user data messages. As can be seen the values decrease by one for each device that is one step closer to the source device, as an example ARDTS for D6 is 1.

The second row shows the example when the maximum allowed path length is set to "the path length of the shortest possible path" plus 1 allowed additional hop. This means that only devices that are on a path with the path length of 5, or shorter, should relay user data messages. As can be seen the values decrease by one for each device that is one step closer to the source device, as an example ARDTS for D6 is 2.

The third row shows the example when the maximum allowed path length is set to "the path length of the shortest possible path" plus 2 allowed additional hops. This means that only devices that are on a path with the path length of 6, or shorter, should relay user data messages. As can be seen the values decrease by one for each device that is one step closer to the source device, as an example ARDTS for D6 is 3.

FIG. 9 now shows examples on how ARDTS can be used when determining whether a relaying device is on a short enough path.

The description below focuses on D6 being the relaying device (as indicated in the upper part of FIG. 9), but will also cover when D3 and D8 are the relaying device.

The table in the lower part of FIG. 9 shows values for shortest distance between the source device and the relaying device as well as for ARDTS.

Each row in the table shows values for a specific device. As can be seen, in the upper part of FIG. 9, some devices are on multiple paths (for example D6 and D3), while some are not (for example D8). Devices that are on multiple paths will have values in multiple rows, one row per path, thus:

D6 has values in two rows (one for P2 and one for P3)
D3 has values in two rows (one for P1 and one for P2)
D8 has values in one row (for P3).

The left most part, or block, of the table, with the header "Distance to Source Device", is related to the determination of the shortest distance between the source device and the relaying device.

Each row shows the distance to the source device from the relaying device, for relaying device on a path that the relaying device is part of. In case the relaying device is part of multiple paths, there will be multiple rows, one for each path. The distances to the source device can be different in the same relaying device on different paths. The distance to the source device from the relaying device can be obtained from the hop counter in the ping message. The ping message (or instances thereof) can arrive multiple times, if the path branches towards the source device.

As an example, device D3 is part of the paths P1 and P2. When the ping message arrives via P1 it has passed D1 and D2 before reaching D3, here the distance to the source device will be 2. When the ping message arrives via P2 it has passed D1, D2 and D6 before reaching D3, here the distance to the source device will be 3.

The shortest distance between the source device and the relaying device is the shortest distance of the one or more values for the distance to the source device for the different paths. In the example above the shortest distance between the source device and the relaying device for D3 as relaying device is the lowest value of 2 and 3, which is 2. Meaning that in any of the paths that D3 is part of, the shortest distance to the source device is 2.

The three rightmost parts, or blocks, of the table are related to the determination of ARDTS.

Each of the three parts, or blocks, relates to a specific design criteria (meaning different values for maximum allowed path length), represented by different ARDTS start values (meaning the values in the destination device), the design criteria are the same as the examples used in the table in FIG. 8.

Each row, in each part or block, shows a value for ARDTS for a relaying device related to a path that the relaying device is part of. In case the relaying device is part of multiple paths, there will be multiple rows, one for each path. ARDTS in the same relaying device can be different on different paths. ARDTS can be determined based on the related RDTS, which is carried in the RDTS field in the ping response message, how this can be done will be elaborated on further below. The ping response message (or instances thereof) can arrive multiple times, if the path branches towards the destination device.

As an example (as shown in FIG. 5, FIG. 7 and FIG. 9), device D6 is part of the paths P2 and P3. When the ping response message arrives via P2 it has passed D5, D4 and D3 before reaching D6. If using the mid design criteria (where ARDTS equals 5 in the destination device) ARDTS in D6 will be 2 in path P2. When the ping response message arrives via P3 it has passed D5, D4, D8 and D7 before reaching D3. If using the mid design criteria (where ARDTS equals 5 in the destination device) ARDTS in D6 will be 1 in path P3.

ARDTS is the longest, or maximum, ARDTS for a relaying device related to a path. In the example above ARDTS for D6 is the highest value of 2 and 1, which is 2. The maximum ARDTS (which is the one that is to be selected as the ARDTS) represents the ARDTS which has passed less nodes, meaning the ARDTS in the ping response message that has been traveling the shortest way from the destination device to the relaying devices.

Now let's give a few examples of how the relaying device would determine whether it is on a short enough path.

As stated further above, a device is on a short enough path if ARDTS is greater than or equal to the shortest distance between the source device and the relaying device, otherwise not.

Let's start discussing the case where the start value of ARDTS (the maximum allowed path length) is set to "the path length of the shortest possible path". The parts of the table that are of interest here is the leftmost part (column 3 with the headers "Distance to Source Device" and "Distance"). And the leftmost of the three parts to the right (column 4 with the header "ARDTS equals 4 in DD"). Let's cover the cases when D6, D3 and D8 are the relaying devices. (The logic is explained in detail for D6, the logic for D3 and D8 is identical)

In D6
    The shortest distance to the source device
        Is the minimum value of the distance fields (column 3) for the applicable paths P2 (row 2) and P3 (row 3)
        Is 2
    ARDTS
        Is the maximum value of the Value in the Dx fields (column 4) for the applicable paths P2 (row 2) and P3 (row 3)
        Is 1
    ARDTS is not greater than or equal to the shortest distance to the source device.
        Thus D6 is not on a short enough path In D3
>The shortest distance to the source device
>>Is the minimum value of the distance fields (column 3) for the applicable paths P1 (row 4) and P2 (row 5)
>>Is 2
>ARDTS
>>Is the maximum value of the Value in the Dx fields (column 4) for the applicable paths P1 (row 4) and P2 (row 5)
>>Is 2
>ARDTS is greater than or equal to the shortest distance to the source device.
>Thus D3 is on a short enough path In D8
>The shortest distance to the source device
>>Is the minimum value of the distance fields (column 3) for the only applicable path P3 (row 6)
>>Is 4
>ARDTS
>>Is the maximum value of the Value in the Dx fields (column 4) for the only applicable path P3 (row 6)
>>Is 2
>ARDTS is not greater than or equal to the shortest distance to the source device.
>Thus D8 is not on a short enough path Next let's take a look at the case where the start value of ARDTS (the maximum allowed path length) is set to "the path length of the shortest possible path" plus one. Making the same analysis as above, with the exception of using data from column 5 with the header "ARDTS equals 5 in DD" when obtaining ARDTS, one will find that:
- D6 is on a short enough path
- D3 is on a short enough path
- D8 is not on a short enough path Next let's take a look at the case where the start value of ARDTS (the maximum allowed path length) is set to "the path length of the shortest possible path" plus two. Making the same analysis as above, with the exception of using data from column 6 with the header "ARDTS equals 6 in DD" when obtaining ARDTS, one will find that:
- D6 is on a short enough path
- D3 is on a short enough path
- D8 is on a short enough path As is mentioned above ARDTS is based on a related value RDTS. RDTS is carried in the remaining distance to source field (529) in the ping response message (520). RDTS can have two different meanings depending on how the system is designed. RDTS could mean either of:
- The allowed remaining distance to source
- The remaining distance to source on the shortest possible path In order for the ARDTS to allow all relaying devices to obtain ARDTS, the corresponding RDTS value has to be distributed through the paths, each relaying device in the paths has to contribute by relaying the ping response message towards the source device. A relaying device that receives a ping response message will obtain the RDTS value, step it, use it store it locally or both, insert it in the ping response message that will be forwarded towards the source device.

The relaying device (RD) will perform some, or all, of the following steps (not necessarily in the exact order listed below) in order to contribute to the distribution of the RDTS value:

- Receive a ping response message (520) from the destination device (DD, D5) intended for the source device (SD, D1).
- Determine whether the ping response message is intended for the relaying device (meaning that it would be the response to a ping message originating in the relaying device, rather than in the source device).
- If the ping response message is not intended for the relaying device:
  - Obtain RDTS from the RDTS field (529) in the ping response message (520)
  - decrease the obtained RDTS, indicating that one more hop towards the source device has been successfully made.
  - Relay the ping response message (520), with the RDTS field now containing the obtained and decreased RDTS.

Please note that in analogy with the discussion on the various ways of initiating the hop counter and stepping the hop counter, the initial value of ARDTS (and/or RDTS) and the stepping of ARDTS (and/or RDTS) could be implemented in various ways. The most straightforward alternative is to set the start value (the value of ARDTS in the destination device) to the maximum allowed path length, and to step by decreasing by one. Another straightforward alternative is to set the start value to maximum allowed path length minus one, and to step by decreasing by one. Which of these ways to choose depends on whether a relaying device use the value before stepping it, or the other way around. Basically, it is about whether the receiving device should regard the RDTS value in the ping response message as valid in the sending device or in the receiving device. A wide variety of other approaches are possible, as long as the involved devices agree on the logic.

The description of the steps in the bulleted list, describes the basic mechanism for how the RDTS value is distributed through devices on a path.

In addition to the above, if the relaying device receives multiple RDTS values in multiple ping response messages that are related to the same ping message, then the relaying device has to determine which RDTS value is largest, and use the largest value when determining ARDTS. The relaying device could also choose to use the larger value when relaying a specific ping response message, or simply use the value obtained when receiving that specific ping response message.

Also depending on the meaning of RDTS, different actions has to be taken to obtain ARDTS.

If RDTS means the allowed remaining distance to source, then ARDTS equals RDTS (and the relaying device does not have to obtain the allowed additional hops separately).

If RDTS means the remaining distance to source on the shortest possible path, then ARDTS can be calculated from the sum of RDTS and the allowed additional hops (which has to be obtained separately). Here, in analogy with the related description of FIG. 7, the allowed additional hops could be obtained in a variety of ways. Depending on the implementation the relaying device could obtain the allowed additional hops from, any of:
- The ping message (510), sent from the source device
  - In the allowed additional hops field (518)
- The ping response message (520), sent from the destination device
  - In the allowed additional hops field (528)
- The allowed additional hops could be pre-configured in the relaying device The user data message (530), sent from the source device
In the allowed additional hops field (538)
Another message, sent from another device.

In the three first ways above ARDTS will be available in the relaying device upon reception of a ping response message (the only one, or one of many).

In the fourth way, ARDTS will be available upon reception of the user data message.

In the fifth way, ARDTS could be available at different times depending on the implementation.

A comparison with using TTL (Time to Live) will be in analogy with the comparison made when discussing FIG. 7.

Figure 10:
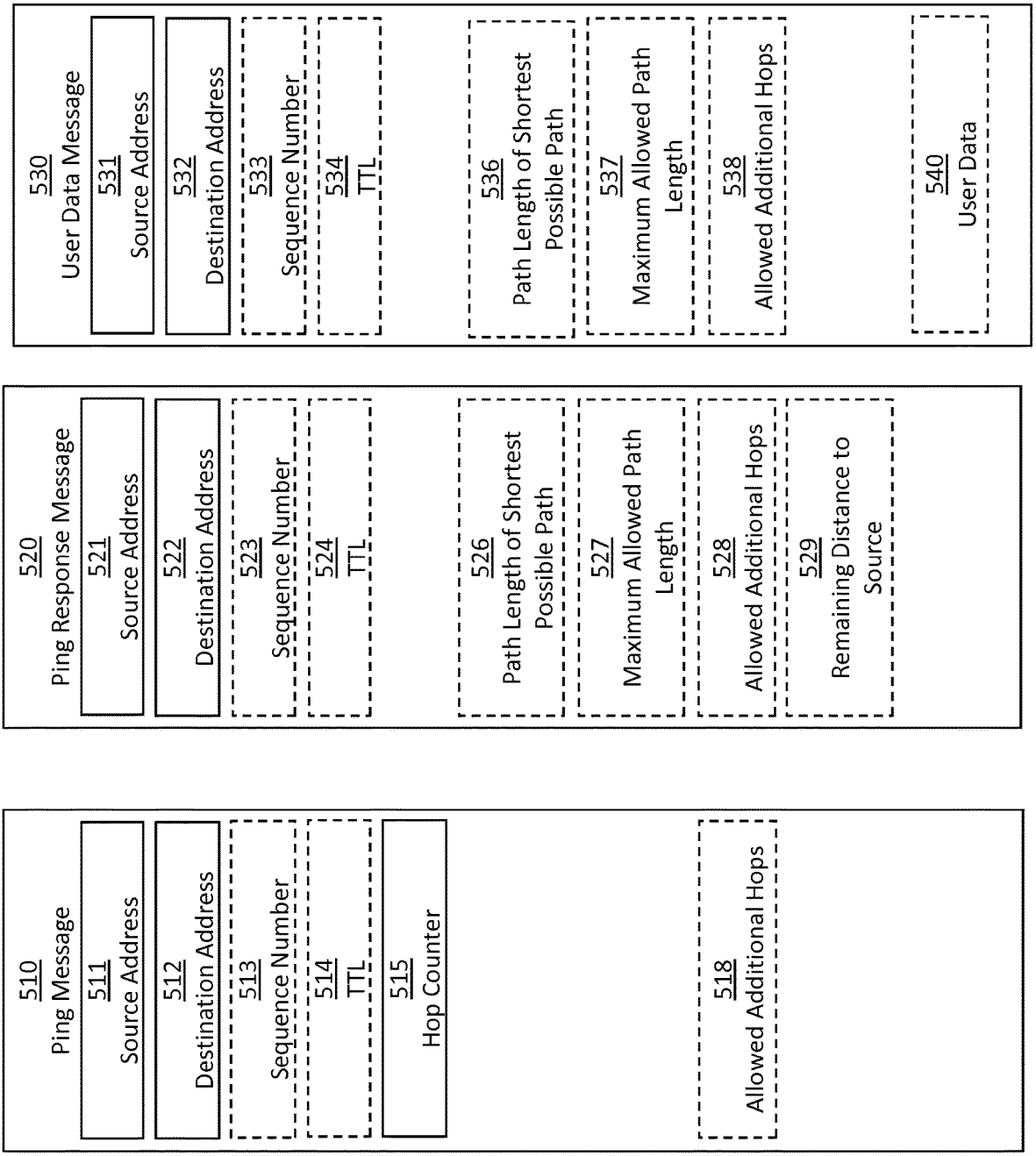
FIG. 10 shows different message formats.

FIG. 10 shows the message formats for the different messages types. The exact use of the message types and the fields are described throughout the description. A short overview is given below.

The description focus on three different message types, the Ping Message (510), the Ping Response Message (520) and the User Data Message (530). Some fields are present in all the three message types, and some fields are unique for only one message type. When using an x in the field reference below, it means that the description is generic and covers the field in all message types.

Before describing the address fields, it is important to point out that throughout this description, the following terminology is used for the different devices, unless specifically stated.

The source device—denotes the device that wants to send a user data message to, or intended for, the destination device. The source device will, at some point before sending the user data message (530), send a ping message (510) to, or intended for, the destination device, among other things in order to find out if the destination device is reachable and how far away it is, measured in hops. Another way of expressing this is to say that the source device is the originator of the ping message, and of the user data message, and that the destination device is the intended receiver. The ping message, and also the user data message, might be relayed by other devices on different paths towards the destination device. The source device is still the originator of the ping message, and the user data message, when being relayed. The corresponding relayed messages can be seen as different instances of the original device, the corresponding relayed messages are principally copies of the original message even though the values in some fields might be changed.

The destination device—denotes the device that is the intended receiver of the ping message (510) and the user data message (530). The destination device will, upon reception of a ping message, respond by sending back a ping response message (320) intended for the source device. In this case the destination device is the originator of the ping response message and the source device is the intended receiver.

The relaying device—denotes a device that will take the decision on whether to relay a user data message originating in the source device intended for the destination device.

All of the different scenarios described herein have the following overall message flow goal. The source device sends a ping message to the destination device, the destination device responds with a ping response message, the source device will then send a user data message to the destination device. All the different messages might be relayed by other devices.

The Source Address 5×1 and Destination Address 5×2 are two fields that are present in messages of all message types. The Source Address indicates the originator of the message, while the destination address indicates the intended receiver of the message.

The Sequence Number 5×3 is an optional field, in the meaning that whether it is present or not and how the use would be implemented if present is not fundamental for the basics of the embodiments described. If present it could be utilised to separate different messages, for example it could identify different user data messages from the specific source device to a specific destination device.

The TTL (Time to Live) 5×4 is an optional field, in the meaning that whether it is present or not and how the use would be implemented if present is not fundamental for the basics of the embodiments described. TTL is useful for setting limits for how many hops a message should be allowed to make on its way from the destination node to a source node.

The User Data field 540 carries the user data in the user data message (530).

The remaining fields has been explained in detail when discussing different embodiments of the invention.

Figure 11:
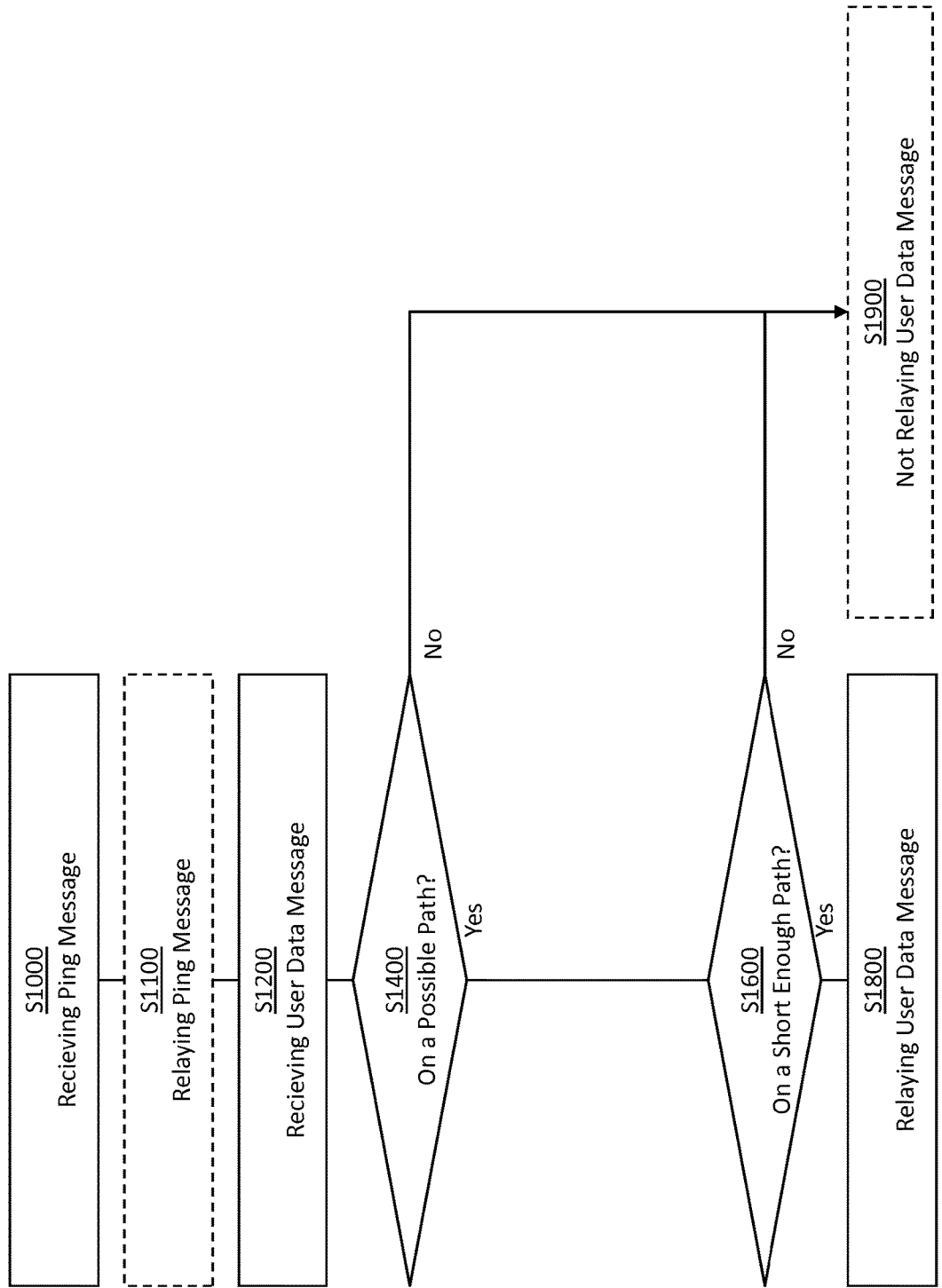
FIG. 11 is a flowchart depicting embodiments of a method in a relaying device.

FIGS. 11-14 are simplified flowcharts depicting different embodiments of a method in a relaying device. FIG. 11, which shows more generic aspects, is also the basis for FIGS. 12 to 14, which shows more specific aspects.

These flow charts aim at describing the top level aspects of the steps in the method. The more intricate details of for example which parameters to obtain from which message in the different embodiments are elaborated on in relation to FIGS. 1-9.

FIG. 11 is a simplified flowchart describing the generic embodiments of a method in a relaying device. This flow chart covers both of the two main embodiments in this description. The two main embodiments describes how a relaying device determines whether to relay a user data message. In both of the main embodiments the determination of whether to relay a user data message is based on the relaying device determining whether the it is on a short enough path, between the source device and the destination device. The main difference between the two main embodiments is how the relaying device determines if it is on a short enough path, this will be elaborated on in relation to FIGS. 12-14.

Figure 12:
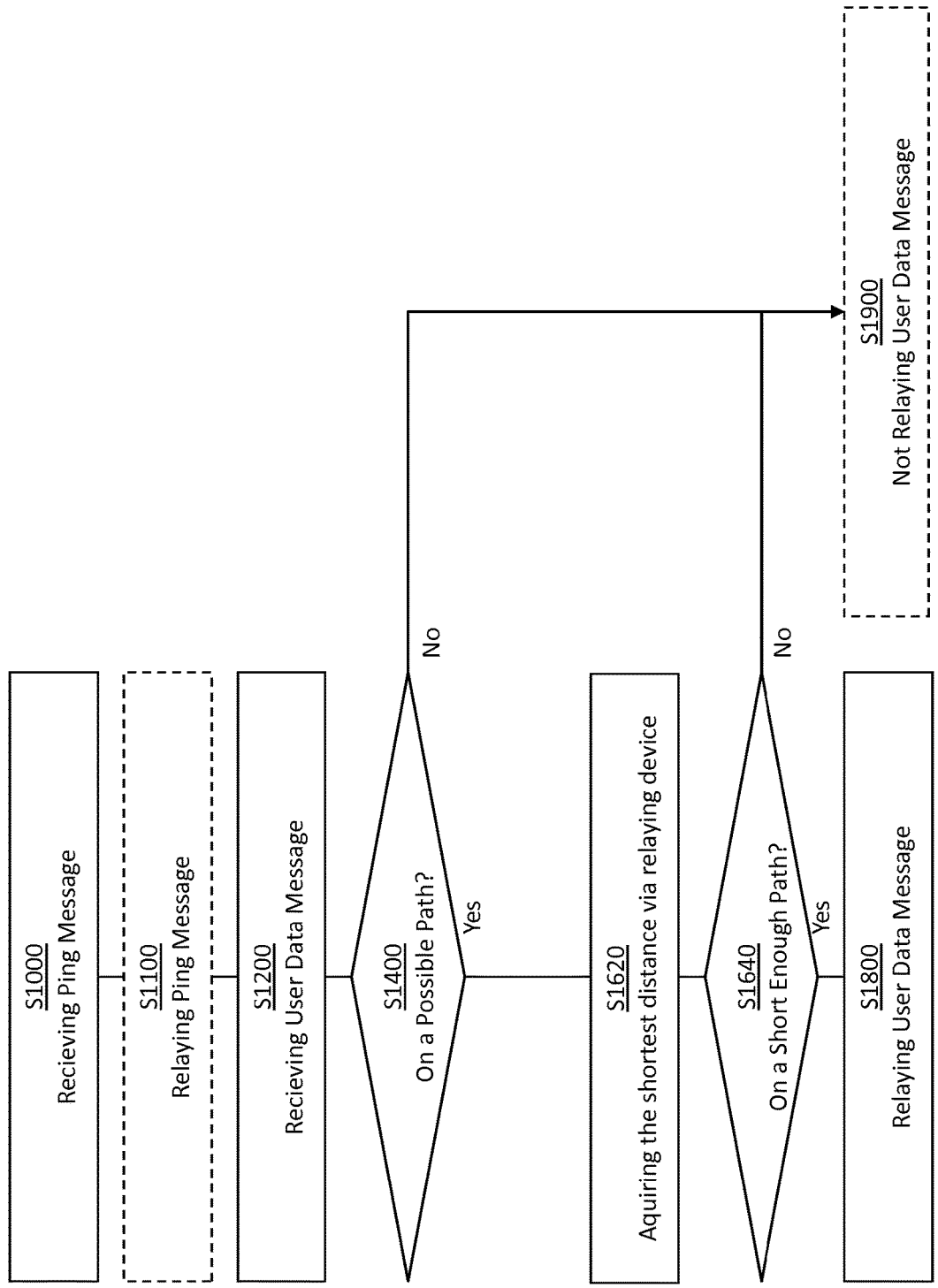
FIG. 12 is a flow flowchart depicting embodiments of a method in a relaying device when taking decisions on whether to relay or not based on the shortest distance via the relaying device.

The relaying device will:
- S1000—receive a ping message, 510 (originating in the source device, intended for the destination device) and obtain one or more parameters from the ping message. An example of a parameter that is needed in both of the two main embodiments is the Hop Counter, 514.
- S1100—relay the ping message towards the destination device
- S1200—receive a user data message, 530 (originating in the source device, intended for the destination device) that is related to the ping message.
- S1400—determine whether it is on a possible path, based on whether it has received a ping response message, 520, related to the ping message, 510.
  - If it is not on a possible path
    - S1900—Not relay the user data message
  - If it is on a possible path:
    - S1600—determine if it is on a short enough path
      - If it is not on a short enough path
        - S1900—Not relay the user data message
      - If it is on a short enough path
        - S1900—Relay the user data message FIG. 12 is a flow flowchart depicting embodiments of a method in a relaying device when taking decisions on whether to relay or not is based on obtaining the shortest distance via the relaying device.

The difference between this flow chart and the flow chart in FIG. 11 is that:
- S1600—determine if it is on a short enough path Can be broken down into two steps.
- S1620—acquiring the shortest distance via relaying device.
- S1640—determine if it is on a short enough path (based on the shortest distance via relaying device)

FIG. 13 is a flow flowchart depicting embodiments of a method in a relaying device for acquiring the shortest distance via the relaying path using pinging. It outlines in more detail the case when the relaying device obtains the shortest distance via the relaying device by pinging the source device and the destination device. This means that the relaying device would obtain the shortest distance from the relaying device to the source device by pinging the source device, and obtain the shortest distance from the relaying device to the destination device by pinging the destination device, and then add the two distances. This is illustrated in FIG. 13.

- S1621 shows the relaying device initiating the pinging of the source device by transmitting a ping message (510) to the source device.
- S1622 shows the relaying device receiving a ping response message from the source device (520), the ping response message (520) being associated with the ping message (510) sent in S1621. The ping response message (520) contains the path length of the shortest possible path (526), representing the distance between the relaying device and the source device.
- S1623 shows the relaying device initiating the pinging of the destination device by transmitting a ping message (510) to the destination device.
- S1624 shows the relaying device receiving a ping response message from the destination device (520), the ping response message (520) being associated with the ping message (510) sent in S1623. The ping response message (520) contains the path length of the shortest possible path (526), representing the distance between the relaying device and the destination device.
- S1625 shows the determining of the shortest distance via the relaying device. This determination would be done by simply adding the two distances that were obtained from the shortest possibly path in the ping response messages.

The steps in FIG. 13 do not necessarily have to happen in the order as shown in the picture. The person skilled in the art will realize that; which device is pinged first and in which order the ping response messages are received does not affect the logic or the calculations.

Figure 14:
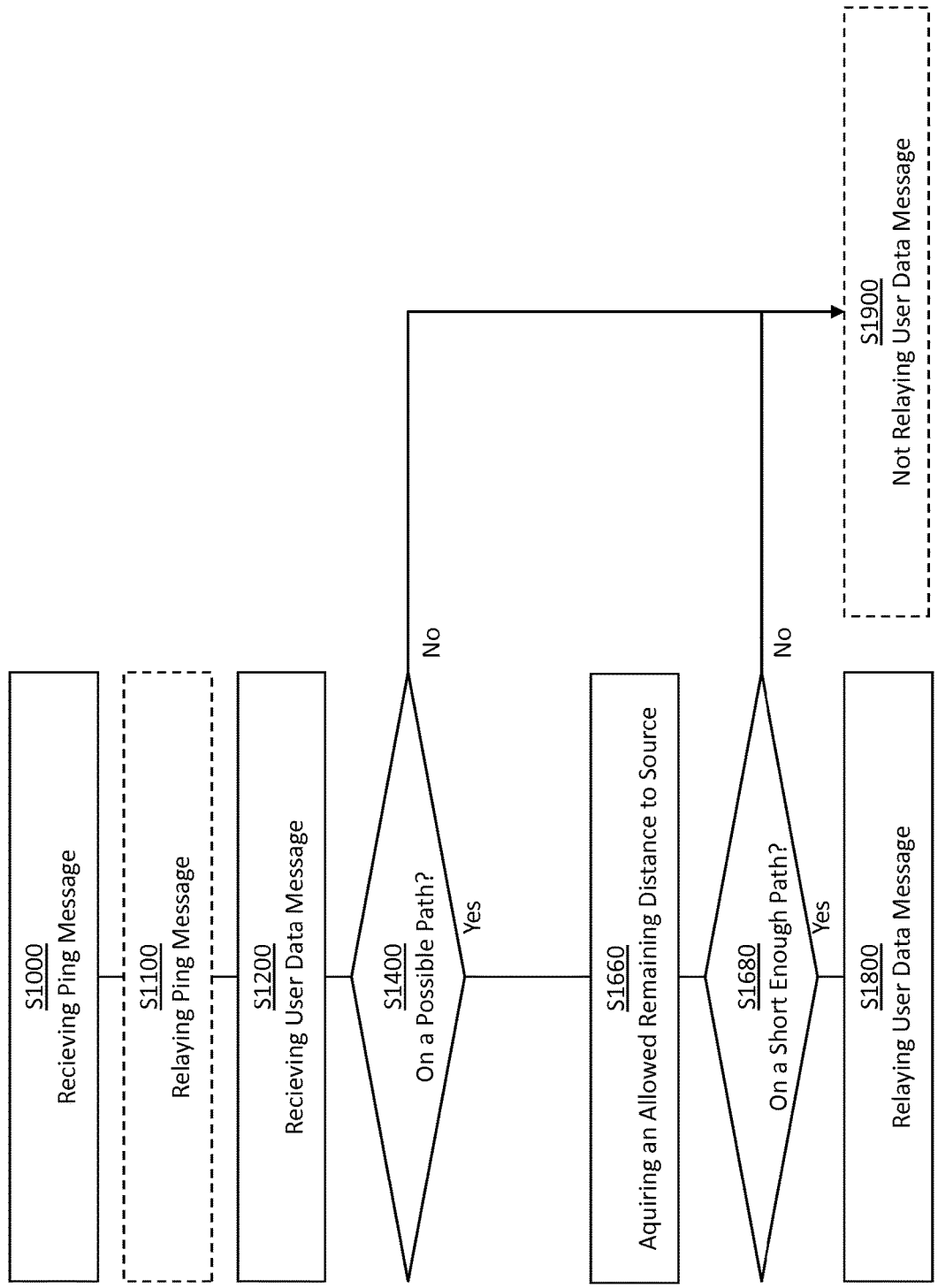
FIG. 14 is a flow flowchart depicting embodiments of a method in a relaying device when taking decisions on whether to relay or not based on the allowed remaining distance to source, ARDTS.

FIG. 14 is a flow flowchart depicting embodiments of a method in a relaying device when taking decisions on whether to relay or not is based on the allowed remaining distance to source (ARDTS).

The difference between this flow chart and the flow chart in FIG. 11 is that:
- S1600—determine if it is on a short enough path Can be broken down into two steps.
- S16600—acquiring the allowed remaining distance to source.
- S1640—determine if it is on a short enough path (based on the allowed remaining distance to source)

Figure 15:
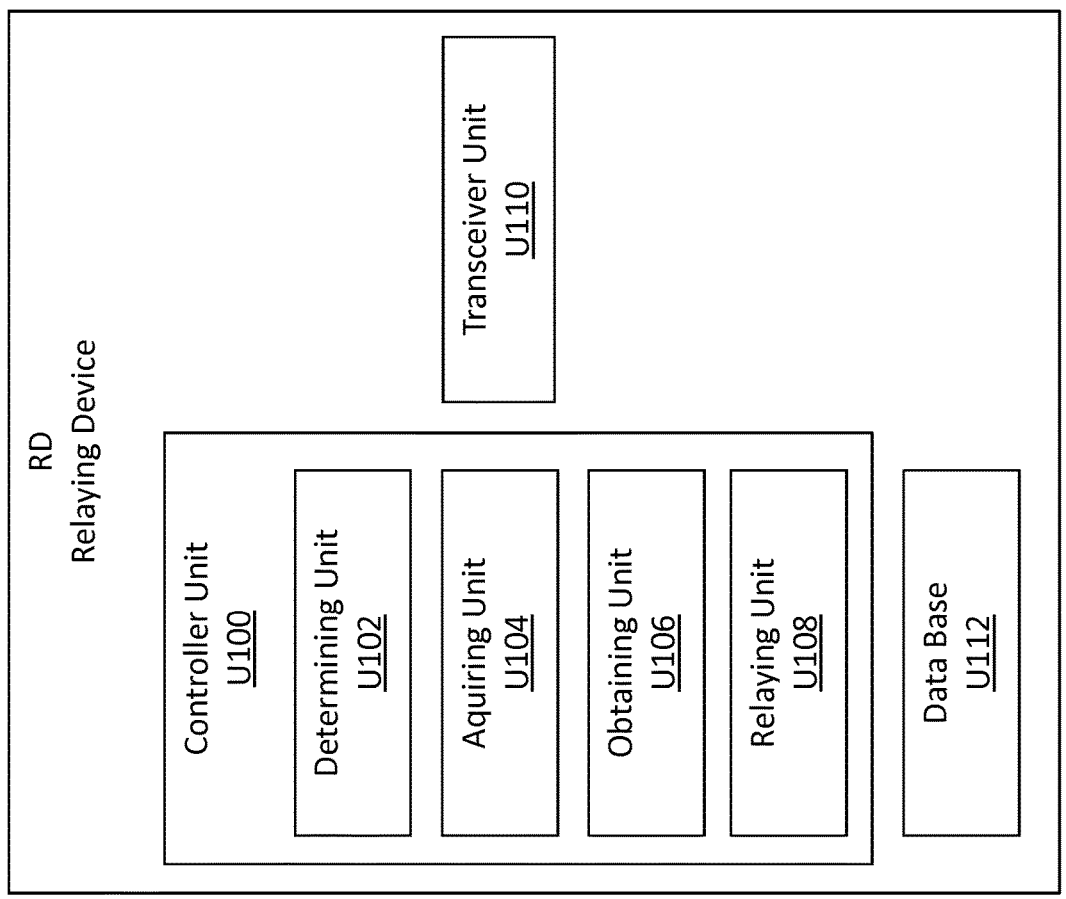
FIG. 15 is a schematic block diagram illustrating embodiments of a relaying device.

FIG. 15 is a schematic block diagram illustrating embodiments of a relaying device.

The relaying (RD) device comprises various units.

A controller unit (U100) further comprising, a determining unit (U102), an acquiring unit (U104), an obtaining unit (U106) and a relaying unit (U108), where the controller unit (U100) is (and/or the comprised units are) configured to make determinations, acquiring and obtaining information and relaying messages, according to the various embodiments described in this specification.

A data base (U112) for permanently or temporarily storing different information according to the various embodiments described in this application.

A transceiver unit (U110) that is configured to transmit and receive the various messages according to the various embodiments described in this application.

Figure 16:
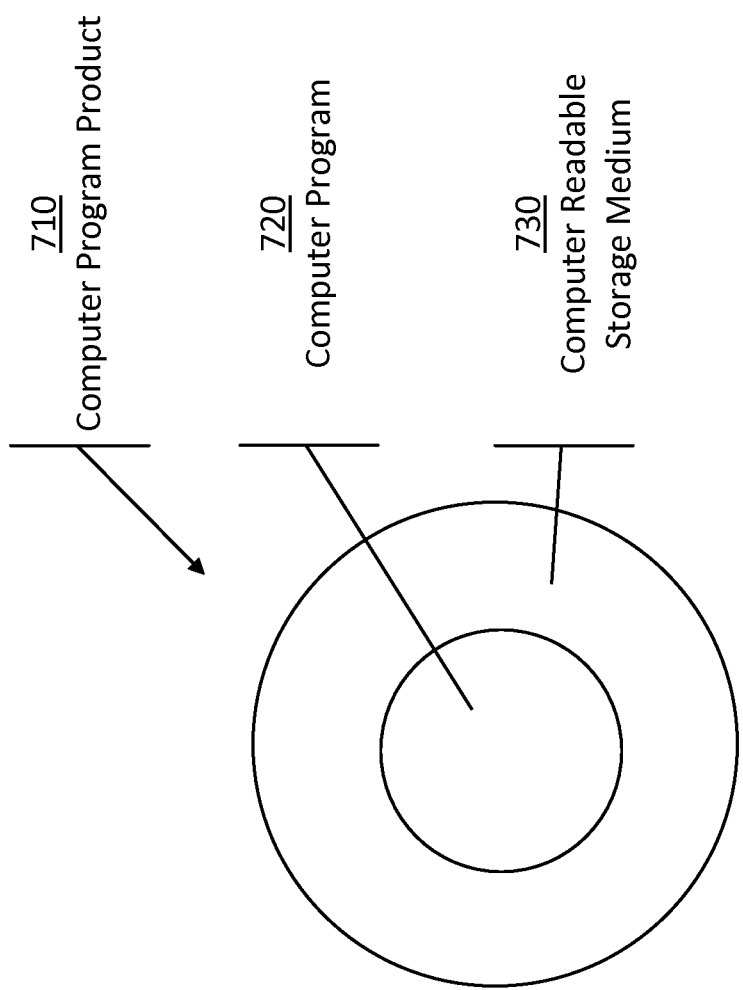
FIG. 16 shows one example of a computer program product comprising a computer readable storage medium and a computer program according to an embodiment.

FIG. 16 shows one example of a computer program product.

The computer program product (710) comprising a computer program (720), and a computer readable storage medium (730) on which the computer program is stored, where the computer program when run on the relaying device causes the relaying device to execute any or all of the various embodiments herein.

The embodiments herein may be implemented through combination of analog and digital circuits, and one or more controller units, together with computer program code for performing the functions and actions of the embodiments herein. The program code mentioned above may also be provided as a computer program product, for instance in the form of a data carrier carrying computer program code for performing the embodiments herein when being loaded into the mobile communications device. One such carrier may be in the form of a CD ROM disc. It is however feasible with other data carriers such as a memory stick. The computer program code may furthermore be provided as pure program code on a server and downloaded to the mobile communications device at production, and/or during software updates.

Those skilled in the art will also appreciate that the blocks in the block diagram, may refer to a combination of analog and digital circuits, and/or one or more controller units, configured with software and/or firmware, e.g. stored in any of the storage units, that when executed by the one or more controller units perform as described above. One or more of these controller units, as well as any other combination of analog and digital circuits, may be included in a single application-specific integrated circuitry (ASIC), or several controller units and various digital hardware may be distributed among several separate components, whether individually packaged or assembled into a system-on-a-chip (SoC). The one or more controller units may be any one of, or a combination of a central processing unit (CPU), graphical processing unit (GPU), programmable logic array (PAL) or any other similar type of circuit or logical arrangement.

When using the word "comprise" or "comprising" it shall be interpreted as non-limiting, i.e. meaning "consist at least of".

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:
1. A method, being performed by a relaying device (RD), for relaying user data messages originated in a source device (SD) intended for a destination device (DD), where the source device (SD), the relaying device (RD) and the destination device (DD) participates in a mesh network, the method comprising:
  receiving a first ping message, originating in the source device (SD) intended for the destination device (DD), where the first ping message comprises a first hop counter;
  relaying the first ping message by stepping the first hop counter and transmitting the first ping message;
  receiving a user data message originating in the source device (SD) intended for the destination device (DD);
  determining whether the relaying device (RD) is on a possible path, indicating that the relaying device (RD) is on a path from the source device (SD) to the destination device (DD);
  determining whether the relaying device (RD) is on a short enough path, indicating that the relaying device (RD) is on a path from the source device (SD) to the destination device (DD) that is deemed short enough to justify relaying; and
  relaying the user data message only if the relaying device (RD) is on the possible path and on the short enough path,
  wherein the determining whether the relaying device (RD) is on the short enough path comprises:
    acquiring a shortest distance via the relaying device, indicating the number of hops on a shortest path from the source device (SD) via the relaying device (RD) to the destination device (DD); and
    determining that the relaying device (RD) is on the short enough path based on at least the shortest distance via the relaying device and the path length of shortest possible path.

2. The method according to claim 1, wherein the determining whether the relaying device (RD) is on the possible path, comprises:
  determining that the relaying device (RD) is on the possible path only if the relaying device (RD) has received a first ping response message, originating in the destination device (DD), intended for the source device (SD), where the first ping response message is related to the first ping message and comprises a first path length of shortest possible path.

3. The method according to claim 1, wherein the determining whether the relaying device (RD) is on the short enough path, further comprises:
  basing the determination on an allowed additional hops value.

4. The method according to claim 1, wherein the acquiring the shortest distance via the relaying device comprises:
  obtaining the shortest distance via the relaying device from a database in the relaying device.

5. The method according to claim 1, wherein the acquiring the shortest distance via the relaying device comprises:
  obtaining the shortest distance via the relaying device from another device.

6. The method according to claim 1, wherein the acquiring the shortest distance via the relaying device comprises:
  transmitting a second ping message intended for the source device (SD);
  receiving a second ping response message originating in the source device (SD), intended for the relaying device (RD), where the second ping response message is related to the second ping message and comprises a second path length of shortest possible path;
  transmitting a third ping message intended for the destination device (DD);
  receiving a third ping response message originating in the destination device (DD), intended for the relaying device (RD), where the third ping response message is related to the third ping message and comprises a third path length of shortest possible path; and
  determining the shortest distance via the relaying device based on the second and third path length of shortest possible path.

7. The method according to claim 1, wherein the first ping response message further comprises a remaining distance to source indicating the remaining number of hops from the relaying device (RD) to the source device (SD), and wherein the determining whether the relaying device (RD) is on the short enough path comprises:
  determining that the relaying device (RD) is on the short enough path based on at least the first hop counter and the remaining distance to source.

8. The method according to claim 7, wherein the determining whether the relaying device (RD) is on the short enough path, further comprises:
  basing the determination on an allowed additional hops value.

9. The method according to claim 7, further comprising:
  relaying the first ping response message, by stepping the remaining distance to source and transmitting the first ping response message.

10. The method according to claim 7, further comprising:
  relaying the first ping response message, by stepping the remaining distance to source and transmitting the first ping response message, only if the relaying device (RD) is on the short enough path.

11. A method, being performed by a relaying device (RD), for omitting relaying user data messages originated in a source device (SD) intended for a destination device (DD), where the source device (SD), the relaying device (RD) and the destination device (DD) participates in a mesh network, the method comprising:
  receiving a first ping message, originating in the source device (SD) intended for the destination device (DD), where the first ping message comprises a first hop counter;
  relaying the first ping message by stepping the first hop counter and transmitting the first ping message;
  receiving a user data message originating in the source device (SD) intended for the destination device (DD);
  determining whether the relaying device (RD) is not on a short enough path, indicating that the relaying device (RD) is not on a path from the source device (SD) to the destination device (DD) that is deemed short enough to justify relaying; and
  determining whether the relaying device (RD) is not on a possible path, indicating that the relaying device (RD) is not on a path from the source device (SD) to the destination device (DD); and
  not relaying the user data message if the relaying device (RD) is not on the short enough path or is not on the possible path,
  wherein the determining whether the relaying device (RD) is not on the short enough path comprises:
    acquiring a shortest distance via the relaying device, indicating the number of hops on a shortest path from the source device (SD) via the relaying device (RD) to the destination device (DD); and
    determining that the relaying device (RD) is not on the short enough path based on at least the shortest distance via the relaying device and the path length of shortest possible path.

12. The method according to claim 11, wherein the determining whether the relaying device (RD) is not on the possible path, comprises:
- determining that the relaying device (RD) is not on the possible path only if the relaying device (RD) has not received a first ping response message, originating in the destination device (DD), intended for the source device (SD), where the first ping response message is related to the first ping message.

13. A relaying device (RD), for relaying user data messages originated in a source device (SD) intended for a destination device (DD), where the source device (SD), the relaying device (RD) and the destination device (DD) participates in a mesh network, comprising:
- a transceiver unit being configured to receive a first ping message, originating in the source device (SD) intended for the destination device (DD), where the first ping message comprises a first hop counter;
- a controller unit being configured to relay the first ping message by stepping the first hop counter and transmitting the first ping message via the transceiver unit which has been configured to transmit the first ping message;
- the transceiver unit being further configured to receive a user data message originating in the source device (SD) intended for the destination device (DD);
- the controller unit being further configured to determine whether the relaying device (RD) is on a possible path, indicating that the relaying device (RD) is on a path from the source device (SD) to the destination device (DD);
- the controller unit being further configured to determine whether the relaying device (RD) is on a short enough path, indicating that the relaying device (RD) is on a path from the source device (SD) to the destination device (DD) that is deemed short enough to justify relaying; and
- the controller unit being further configured to relay the user data message only if the relaying device (RD) is on the possible path and on the short enough path,
- wherein the determining whether the relaying device (RD) is on the short enough path comprises:
  - acquiring a shortest distance via the relaying device, indicating the number of hops on a shortest path from the source device (SD) via the relaying device (RD) to the destination device (DD); and
  - determining that the relaying device (RD) is on the short enough path based on at least the shortest distance via the relaying device and the path length of shortest possible path.

14. The relaying device (RD) according to claim 13, wherein the controller unit being configured to determine whether the relaying device (RD) is on the possible path, is further configured to:
- determine that the relaying device (RD) is on the possible path only if the relaying device (RD) has received a first ping response message, originating in the destination device (DD), intended for the source device (SD), where the first ping response message is related to the first ping message and comprises a first path length of shortest possible path.

15. The relaying device (RD) according to claim 13, wherein the controller unit being configured to determine whether the relaying device (RD) is on the short enough path, is further configured to:
- base the determination on an allowed additional hops value.

16. The relaying device (RD) according to claim 13, wherein the controlling unit being configured to acquire the shortest distance via the relaying device is further configured to:
- obtain the shortest distance via the relaying device from a database in the relaying device.

17. The relaying device (RD) according to claim 13, wherein the controller unit being configured to acquire the shortest distance via the relaying device is further configured to:
- obtain the shortest distance via the relaying device from another device via the transceiver unit which has been configured to send and receive the messages to the other device.

18. The relaying device (RD) according to claim 13, wherein the controller unit being configured to acquire the shortest distance via the relaying device is further configured to:
- via the transceiver unit transmit a second ping message intended for the source device (SD);
- via the transceiver unit receive a second ping response message originating in the source device (SD), intended for the relaying device (RD), where the second ping response message is related to the second ping message and comprises a second path length of shortest possible path;
- via the transceiver unit transmit a third ping message intended for the destination device (DD);
- via the transceiver unit receive a third ping response message originating in the destination device (DD), intended for the relaying device (RD), where the third ping response message is related to the third ping message and comprises a third path length of shortest possible path; and
- determine the shortest distance via the relaying device based on the second and third path length of shortest possible path.

19. The relaying device according to claim 13, wherein the first ping response message further comprises a remaining distance to source indicating the remaining number of hops from the relaying device (RD) to the source device (SD); and
- wherein the controller unit being configured to determine whether the relaying device (RD) is on the short enough path is further configured to determine that the relaying device (RD) is on the short enough path based on at least the first hop counter and the remaining distance to source.

20. The relaying device (RD) according to claim 19, wherein the controller unit being configured to determine whether the relaying device (RD) is on the short enough path, further being configured to:
- base the determination on an allowed additional hops value.

21. The relaying device (RD) according to claim 19 wherein the controller unit being further configured to:
- relay the first ping response message, by stepping the remaining distance to source and transmitting the first ping response message via the transceiver unit, the transceiver unit being further configured to transmit the first ping response message.

22. The relaying device (RD) according to claim 19, wherein the controller unit being configured to relay the first ping response message, by stepping the remaining distance to source and transmitting the first ping response message via the transceiver unit, the transceiver unit being further configured to transmit the first ping response message, only if the relaying device (RD) is on the short enough path.

23. A relaying device (RD), for omitting relaying user data messages originated in a source device (SD) intended for a destination device (DD), where the source device (SD), the relaying device (RD) and the destination device (DD) participates in a mesh network, comprising:
- a transceiver unit being configured to receive a first ping message, originating in the source device (SD) intended for the destination device (DD), where the first ping message comprises a first hop counter;
- a controller unit being configured to relay the first ping message by stepping the first hop counter and transmitting the first ping message via the transceiver unit which is being configured to transmit the first ping message;
- the transceiver unit being further configured to receive a user data message originating in the source device (SD) intended for the destination device (DD);
- the controller unit being further configured to determine whether the relaying device (RD) is not on a short enough path, indicating that the relaying device (RD) is not on a path from the source device (SD) to the destination device (DD) that is deemed short enough to justify relaying;
- the controller unit being further configured to determine whether the relaying device (RD) is not on a possible path, indicating that the relaying device (RD) is not on a path from the source device (SD) to the destination device (DD); and
- the controller unit being configured to not relay the user data message if the relaying device (RD) is not on the short enough path or is not on the possible path,
- wherein the determining whether the relaying device (RD) is not on the short enough path comprises:
  - acquiring a shortest distance via the relaying device, indicating the number of hops on a shortest path from the source device (SD) via the relaying device (RD) to the destination device (DD); and
  - determining that the relaying device (RD) is not on the short enough path based on at least the shortest distance via the relaying device and the path length of shortest possible path.

24. The relaying device (RD) according to claim 23, wherein the controller unit being configured to determine whether the relaying device (RD) is not on the possible path, is further configured to:
- determine that the relaying device (RD) is not on the possible path only if the relaying device (RD) has not received a first ping response message, originating in the destination device (DD), intended for the source device (SD), where the first ping response message is related to the first ping message.

25. A computer program product comprising a non-transitory computer readable storage medium storing a computer program comprising instructions which, when executed on a relaying device (RD), cause the relaying device (RD) to carry out the method according to claim 1.

* * * * *